United States Patent [19]
Yamagami et al.

[11] Patent Number: 5,592,630
[45] Date of Patent: Jan. 7, 1997

[54] DATA TRANSFER APPARATUS AND METHOD FOR DATA PROCESSING SYSTEM

[75] Inventors: Kenji Yamagami, Kanagawa-ken; Akira Yamamoto; Takao Satoh, both of Sagamihara, all of Japan

[73] Assignee: Hitachi, Ltd., Tokyo, Japan

[21] Appl. No.: 37,022

[22] Filed: Mar. 25, 1993

[30] Foreign Application Priority Data

Apr. 3, 1992 [JP] Japan ................................ 4-081894

[51] Int. Cl.$^6$ ............................. G06F 13/00; G06F 13/14
[52] U.S. Cl. ........................ 395/250; 395/440; 395/464; 395/421.03
[58] Field of Search .................................... 395/425, 400, 395/250, 444, 445, 446, 464, 440, 872, 873, 878, 421.03, 421.07, 439, 494

[56] References Cited

U.S. PATENT DOCUMENTS

| | | | |
|---|---|---|---|
| 4,489,378 | 12/1984 | Dixon et al. | 395/853 |
| 4,490,782 | 12/1984 | Dixon et al. | 395/485 |
| 4,533,995 | 8/1985 | Christian et al. | 395/440 |
| 4,621,320 | 11/1986 | Holste et al. | 395/421.07 |
| 4,860,193 | 8/1989 | Bentley et al. | 395/250 |
| 5,239,644 | 8/1993 | Seki et al. | 395/425 |

FOREIGN PATENT DOCUMENTS

62-92022  4/1987  Japan .

OTHER PUBLICATIONS

Ryan, Thomas W. "Optimizing Cache Performance," CMG '90 Proceedings, pp. 27–37. (English).

*Primary Examiner*—Jack B. Harvey
*Assistant Examiner*—Ario Etienne
*Attorney, Agent, or Firm*—Fay Sharpe Beall Fagan Minnich & McKee

[57] ABSTRACT

A data transfer system includes a controller having a cache memory and a transfer information judging unit for reading information stored in a recording medium and for obtaining a first transfer enabled time for storing the information of a track of the recording medium in the cache and a second transfer enabled time for storing the information of the recording medium in the cache memory. A buffer memory temporarily stores the information read from a request track and a pre-load track of the recording medium at every track, in which between the recording medium and the buffer memory and between the buffer memory and the cache there is a ratio of speed for transferring the information from the recording medium to the buffer memory and a speed for transferring the information from the buffer memory to the cache of 1:n ($1 \leq n$). A buffer controller instructs such that the information of the request track is transferred from the buffer memory to the cache at the first transfer enabled time occurring when at least $(1-1/n)$ of all of the information of the request track in said buffer memory is transferred from the recording medium to the buffer memory and instructs such that the information of the pre-load track is transferred from the buffer memory to the cache at the second transfer enabled time occurring when at least $(1-1/n)$ of all of the information of the pre-load track is transferred from the recording medium to the buffer memory.

14 Claims, 19 Drawing Sheets

NON-TRANSFERRED DATA MANAGEMENT TABLE

ENTRY OF NON-TRANSFERRED MANAGEMENT TABLE

5,592,630

DATA TRANSFER APPARATUS AND METHOD FOR DATA PROCESSING SYSTEM

CROSS-REFERENCE TO RELATED APPLICATION

The application relates to U.S. patent application Ser. No. 07/618,956 filed on Nov. 28, 1990, entitled "DATA WRITING CONTROL SYSTEM FOR MAGNETIC DISK DEVICE", by Akira YAMAMOTO, et al. and assigned to HITACHI, LTD., and HITACHI MICROCOMPUTER SYSTEM LTD., the contents of which are incorporated by reference herein.

BACKGROUND OF THE INVENTION

The present invention relates to a data transfer system having a storage device such as a disk having a buffer capable of transferring data at higher speed than the storage device and a controller with a cache memory, and also relates to a data transfer method for such a system.

In a storage device system having a controller with a cache memory, a difference between data transfer speeds of the storage device and controller can be alleviated by a processor access to data in the cache memory pre-loaded from the storage device. It is important to make a probability of presence of processor accessing data in the cache memory, or a hit percentage, as large as possible in order to efficiently use the cache memory. To this end, not only the data requested by the processor but also the data expected to be read in future are transferred to the cache memory. As described in CMG'90 PROCEEDINGS (1990), pp. 27 to 37, in a sequential read, the controller operates to load not only the track to be accessed but also the following three tracks. It can be expected therefore that all the following accesses become a hit. Also in an access other than the sequential access, the accessed record as well as some records in its track are loaded in the cache memory. It can be expected therefore to improve the hit percentage in an access other than the sequential access.

A technique regarding a buffered storage device is disclosed in JP-A-62-3455. With this technique, the provision of a buffer memory to each storage device eliminates a wait time of the disk to be caused by the contention of a data transfer path between storage devices.

Another technique is also disclosed in JP-A-62-92022 for a storage device system having storage devices and a plurality of controllers each having a cache memory. With this technique, assuming that the ratio of the data transfer speed from a storage device to a controller to that from a controller to a processor is 1:n (1≦n), the data transfer to the channel starts when (1−1/n) times all the data to be transferred to the channel is loaded from the storage device to the controller is completed, the amount of all the data being calculated from a LOCATE instruction issued from the processor. The data transferred from the storage device to the cache memory of the controller includes the requested data and pre-loaded data. Such data transfer requires still further consideration.

A disk unit having a buffer memory is described in U.S. Pat. No. 5,187,778 under the title of "Buffered Disk Unit and Method of Transferring Data Therein". However, this system has no cache memory.

SUMMARY OF THE INVENTION

It is an object of the present invention to provide a data transfer system and method for buffered storage devices capable of improving the throughput of the system without delaying a response to requested data by the processor, while transferring data between the cache memory of the controller and the buffer memory of the storage device at the data transfer speed of the buffer memory.

First, the background from which the present invention was conceptualized will be described.

If the sequential data requested by a processor is one track and the pre-load data is six tracks, the data to be transferred to the cache memory of the controller is seven tracks. Assuming that the ratio of a disk transfer speed to a buffer memory transfer speed is 1:2, the data transfer from the buffer memory to the cache memory of the controller in a conventional transfer method starts when the data of 3.5 tracks has been loaded in the buffer memory. In this case, the transfer of requested data is delayed by the time corresponding to 3.5 tracks.

In the transfer of data of only one track, the data transfer to the cache memory of the controller starts after the data of 0.5 track has been loaded in the buffer memory. In this case, when the cache memory of the controller has loaded one track data, the data transfer from the buffer memory to the controller cache memory caches up with the data transfer from the disk to the buffer memory. It is therefore necessary to read the data of six tracks to be pre-loaded at the disk data transfer speed.

According to a first aspect of the present invention, a data transfer system for buffered storage devices has a controller including a cache memory and a transfer information judging unit, the cache memory being connected to a processor for storing information, and the transfer information judging unit being responsive to an information read instruction issued by the processor for reading information in a recording medium, and obtaining a track containing the information in the recording medium and first and second transfer enabled times when the information of the recording medium is stored in the cache memory, and a storage device connected to the controller includes at least the recording medium, a buffer memory, and a buffer controller, the recording medium having tracks including a requested track storing information requested by the processor and a pre-load track near the requested track, the buffer memory temporarily storing on the track unit basis the information of the requested track and the pre-load track read from the recording medium, and the buffer controller receiving from the controller at least to read the information of the requested track and the first and second transfer enabled times and transferring the information of the requested track and the information of the pre-load track from the buffer memory to the cache memory at the first and second transfer enabled times.

With the arrangement described above, the relation of between the recording medium and the buffer memory to between the buffer memory and the cache memory is set to a ratio 1:n (1≦n) of an information transfer speed from the recording medium to the buffer memory to an information transfer speed from the buffer memory to the cache memory, and the buffer controller instructs to transfer the information of the requested track from the buffer memory to the cache memory at the first transfer enabled time when the information of the requested track transferred from the recording medium to the buffer memory has reached (1−1/n) times all the information of the requested track or more, and instructs to transfer the information of the pre-load track from the buffer memory to the cache memory at the second transfer enabled time when the information of the pre-load track transferred from the recording medium to the buffer memory has reached (1−1/n) times all the information of the pre-load track or more.

This feature is applied to the case where a data read request from the processor is sequential, i.e., the requested track and pre-load tracks are consecutive. Since the data of the requested track is transferred preferentially to the cache memory, a response to the processor will not be delayed. The data of the requested track and pre-load tracks is first loaded and then the data of the requested track is transferred from the buffer memory to the cache memory. It is therefore possible to transfer the data at the transfer speed of the buffer memory, improving the response speed of data requested by the processor.

According to a second aspect of the present invention, a data transfer system has a controller including at least a cache memory and a transfer information judging unit, the cache memory being connected to a processor for storing information, and the transfer information judging unit being responsive to a read instruction issued by the processor for reading information in a recording medium, and obtaining a track containing the information in the recording medium and a transfer enabled time when the information of the recording medium is stored in the cache memory, and a storage device connected to the controller includes at least the recording medium, a buffer memory, and a buffer controller, the recording medium having tracks including a requested track storing information requested by the processor, the buffer memory temporarily storing on the track unit basis the information of the requested track, and the buffer controller receiving from the controller at least to read the information of the requested track the transfer enabled time and transferring the information of the requested track from the buffer memory to the cache memory at the transfer enabled time.

With the arrangement described above, the relation of between the recording medium and the buffer memory to between the buffer memory and the cache memory is set to a ratio 1:n ($1 \leq n$) of an information transfer speed from the recording medium to the buffer memory to an information transfer speed from the buffer memory to the cache memory, and the buffer controller instructs to transfer the information of the requested track from the buffer memory to the cache memory at the transfer enabled time when the information of the requested track transferred from the recording medium to the buffer memory has reached (1−1/n) times all the information of the requested track or more.

This feature is applied not to a sequential data request by the processor but to the case where the requested data is contained within a single requested track. The data requested by the processor and the data on the same track are collectively transferred from the buffer memory to the cache memory at the transfer speed of the buffer memory.

According to a third aspect of the present invention, a data transfer system has a controller including a cache memory and a transfer information judging unit, the cache memory being connected to the processor for storing information, and the transfer information judging unit being responsive to a read instruction issued by the processor for reading information in the recording medium, and obtaining a track containing the information in the recording medium and a transfer enabled time when the information of the recording medium is stored in the cache memory, and a storage device connected to the controller includes at least the recording medium, a buffer memory, and a buffer controller, the recording medium having tracks including a requested track storing information requested by the processor and a pre-load track near the requested track, the buffer memory temporarily storing on the track unit basis the information of the requested track and the pre-load track read from the recording medium, and the buffer controller receiving from the controller at least to read the information of the requested track and the transfer enabled time and transferring the information of the requested track and the information of the pre-load track from the buffer memory to the cache memory at the transfer enabled time.

With the arrangement described above, the relation of between the recording medium and the buffer memory to between the buffer memory and the cache memory is set to a ratio 1:n ($1 \leq n$) of an information transfer speed from the recording medium to the buffer memory to an information transfer speed from the buffer memory to the cache memory, and the buffer controller instructs to transfer the information of the requested track from the buffer memory to the cache memory at the enabled time when the information of the requested track transferred from the recording medium to the buffer memory has reached (1−1/n) times all the information of the requested track or more, and instructs to load the information of a new requested track requested by the processor from the recording medium to the buffer memory after loading the information of the requested track from the recording medium to the buffer memory, and to transfer the information of the new requested track from the buffer memory to the cache memory and thereafter transfer the information of the previous pre-load track from the buffer memory to the cache memory.

This feature is applied to a sequential data request by the processor. It is possible to transfer the data of the requested track and pre-load tracks from the buffer memory to the cache memory by a single connection/disconnection of the transfer path between the buffer memory and the cache memory. Accordingly, it is possible to efficiently transfer the data of the requested track and pre-load tracks of the recording medium, reducing the overhead of the system.

According to a fourth aspect of the present invention, a data transfer system has a controller including a cache memory and a transfer information judging unit, the cache memory being connected to the processor for storing information, and the transfer information judging unit being responsive to a read instruction issued by the processor for reading information in the recording medium, and obtaining a track containing the information in the recording medium and a transfer enabled time when the information of the recording medium is stored in the cache memory, and a storage device connected to the controller includes at least the recording medium, a buffer memory, and a buffer controller, the recording medium having tracks including a requested track storing information requested by the processor and a pre-load track near the requested track, the buffer memory temporarily storing on the track unit basis the information of the requested track and the pre-load track read from the recording medium, and the buffer controller receiving from the controller at least to read the information of the requested track and the transfer enabled time and transferring the information of the requested track and the information of the pre-load track from the buffer memory to the cache memory at the transfer enabled time.

With the arrangement described above, the relation of between the recording medium and the buffer memory to between the buffer memory and the cache memory is set to a ratio 1:n ($1 \leq n$) of an information transfer speed from the recording medium to the buffer memory to an information transfer speed from the buffer memory to the cache memory, and the buffer controller instructs to transfer the information of each of the requested track and the pre-load track from the buffer memory to the cache memory at the transfer enabled time when the information of each of the requested track and the pre-load track transferred from the recording medium to the buffer memory has reached (1−1/n) times all the information of each of the requested track and the pre-load track or more.

This feature is applied to a sequential data request by the processor, and provides an efficient data transfer for the case of a small overhead of connecting the transfer path between the buffer memory and the cache memory.

Fifth to eighth aspects of the present invention are concerned about the data transfer methods corresponding to the above-described four inventions.

DESCRIPTION OF THE PREFERRED EMBODIMENTS

In order to help understand the present invention easily, the structure of a computer system having a general buffered storage device will be first described.

Figure 2:
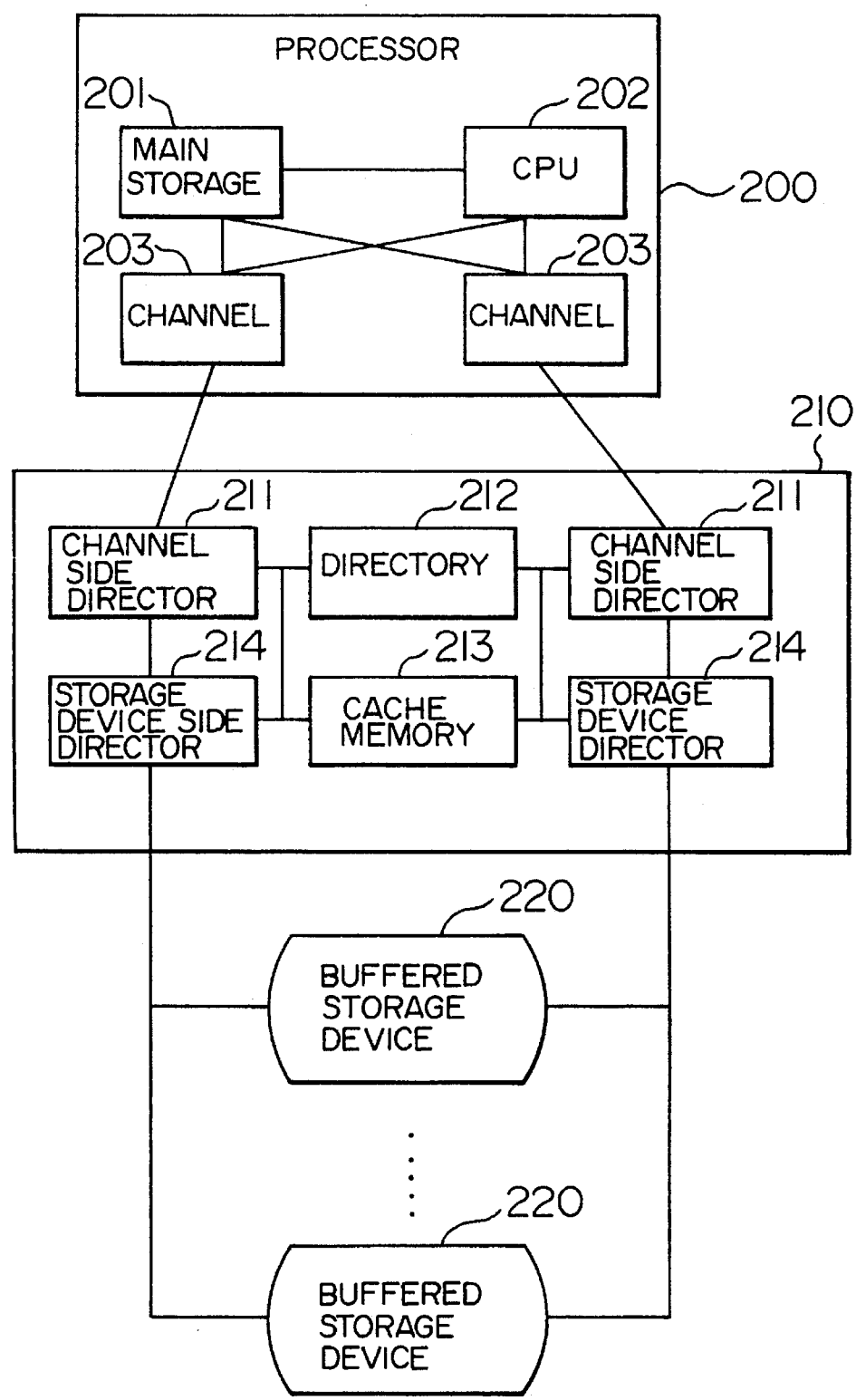
FIG. 2 shows the detail of the controller and processor.

As shown in FIG. 2, a computer system has a processor 200, a controller 210, and one or more buffered storage devices 220. The buffered storage device 220 is simply called a storage device 220. The processor 200 has a CPU 202, a main memory 201, and channels 203. The controller 210 has channel side directors 211, storage device side directors 214, a directory 212, and a cache memory 213. Loaded from the storage device 220 to the cache memory 213 is data having a high access occurrence. The directory 212 stores the management information of the cache memory 213. The channel side director 211 transfers data between the channel 203 and controller 210. The storage device side director 214 transfers data between the storage device 220 and controller 210 and executes a process of loading data to the cache memory 213.

Figure 3:
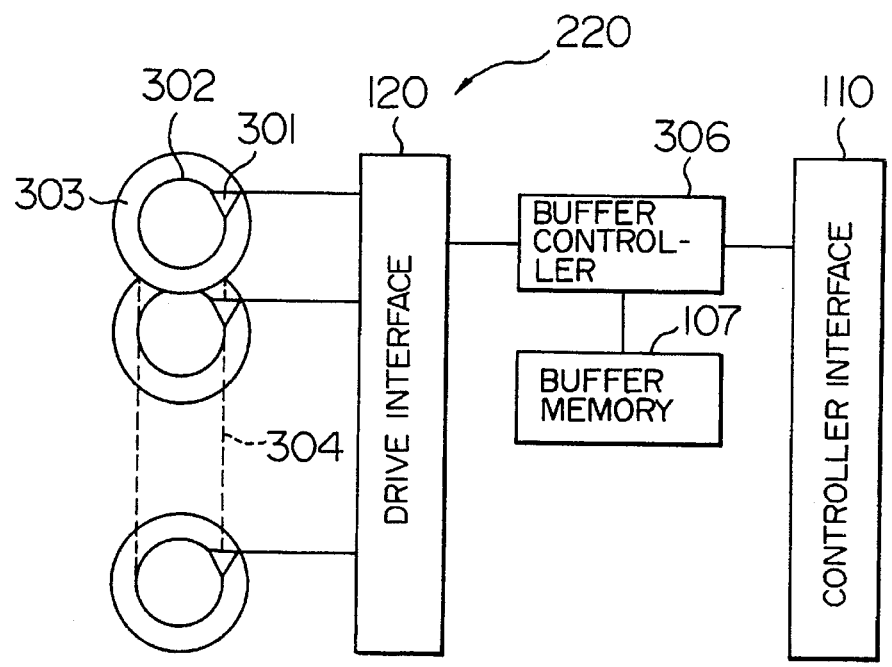
FIG. 3 shows the detail of the storage device.

FIG. 3 diagrammatically shows the structure of the buffered storage device 220. The buffered storage device 220 has a drive interface 120, read/write heads 301, disks 303, a buffer controller 306, and a buffer memory 107. The disk 303 is a medium for storing data. A plurality of disks are provided for each storage device 220. In the following description, each storage device is assumed to have m disks 303. The read/write head 301 is used for reading and writing data from and to the disk 303, and is provided for each disk 303. The read/write head 301 is controlled from the drive interface 120. The buffer memory 107 temporarily stores data read from the disk 303. The buffer controller 306 controls the data transfer between the disk 303 and buffer memory 107 and between the buffer memory 107 and controller 210.

A circular recording unit accessible by the read/write head 301 during one rotation of the disk 303 is a track 302. A plurality of tracks 302 exist on the disk 303. The read/write head 301 is moved to a track 302 to and from which data is written and read. This operation is called a seek operation. In the storage device 220 of this invention, a plurality of read/write heads 301 don't move independently, but they move at the same time. A group of tracks 302 accessible by n read/write heads during one rotation of the disk 301 is called a cylinder 304. Reference numeral 110 represents a controller interface connected to the controller 210. The controller interface 110 receives mainly a read track instruction.

Cylinders 304 are generally given serial numbers in an ascending order from the innermost cylinder, and read/write heads 301 are given serial numbers in an ascending order from the topmost read/write head. The director 211 (to be described later with reference to FIG. 4) identifies a track 302 using a pair of the cylinder number and track number. A track 302 next to a certain track 302 has a head number larger by 1 than that of the certain track 302 at the same cylinder.

Figure 4:
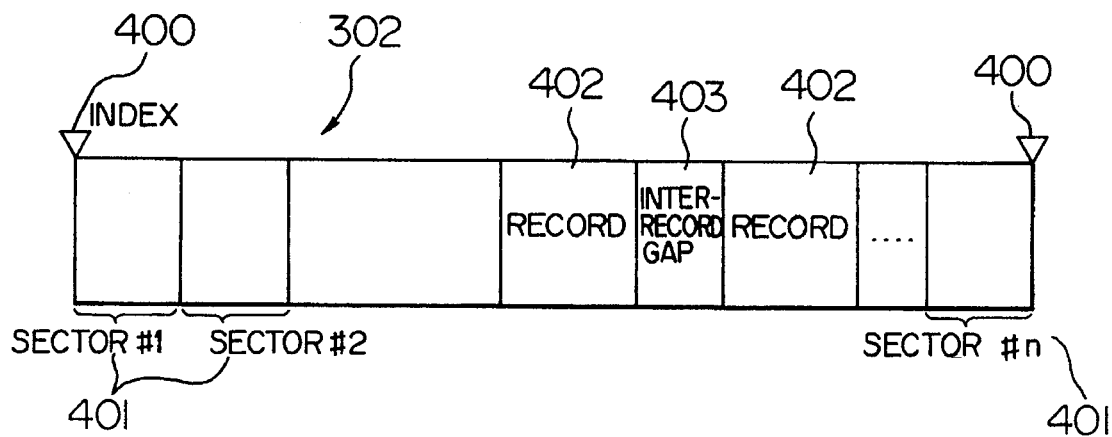
FIG. 4 shows an example of the format of a track on a disk.

FIG. 4 shows a typical example of the structure of a track 302.

The start of a track 302 is defined by a so-called index 400. Each track 302 is divided into sectors 401 each having a predetermined size. The sectors 401 are given serial numbers in an ascending order in the rotation direction starting from the index 400. Each track 302 has one or more records 402 to be read or written. A record gap 403 is present between records 402. The position of the record 402 on the track 302 is represented by a relative length from the index 400 in the rotation direction. A record 402 next to a certain record 402 is a record immediately after the certain record 402 in the rotation direction of the track 302.

The details of embodiments will be described in detail hereinafter assuming that a transfer speed ratio of the buffer memory 107 to the disk 303 is n.

The data transfer system for buffered storage devices according to a first embodiment will be described with reference to FIG. 1. The characteristic feature of the first embodiment is as follows. When a sequential data read instruction is sent from the processor 200 to the controller 210, the requested track and pre-load tracks for the sequential read instruction are identified, and transfer enabled times for the transfer of data of the requested track and pre-load tracks from the buffer memory 107 to the cache memory 213 of the controller 210 are calculated. While transferring the data of the requested track and pre-load tracks from the disk 303 to the buffer memory 107, the data of the requested track and pre-load tracks is transferred from the buffer memory to the cache memory 213 at the respective transfer enabled times. The data of the requested track and pre-load tracks is then transferred to the processor 200.

Figure 1:
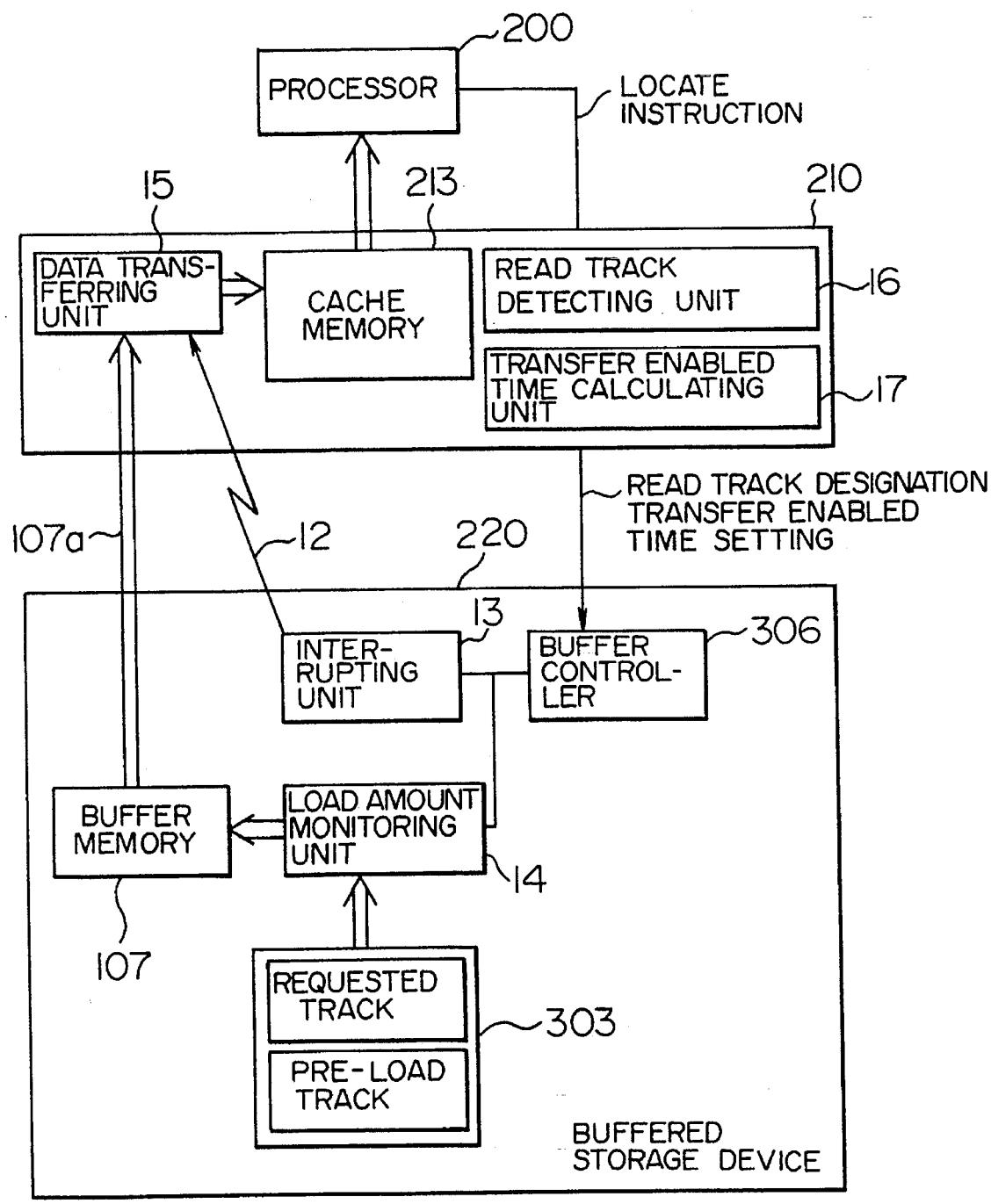
FIG. 1 is a block diagram showing the data transfer system for buffered storage devices according to the present invention.

FIG. 1 shows the structure of a data transfer system with buffered storage devices. When a LOCATE instruction for data read is issued from the processor to the controller 210, a track detecting unit 16 of the controller 210 for obtaining tracks to be read obtains the requested track and pre-load tracks. A transfer enabled time calculating unit 17 calculates transfer enabled times basing upon the number of requested and pre-load tracks and sends them to a buffer controller 306 of the buffered storage device 220. When the buffer controller 306 obtains the tracks to be read and the transfer enabled times, a load process starts in which the data of the tracks to be read including the requested track and pre-load tracks is loaded from the disk 303 to the buffer memory 107 via a load amount monitoring unit 14. The load amount monitoring unit 14 monitors the address and sector number of the track whose data is loaded from the disk 303 to the buffer memory 107. When the sector number of a track becomes in correspondence with the transfer enabled time set by the transfer enabled time calculating unit 17, an interrupting unit 13 supplies an interrupt signal to a data transferring unit 15 of the controller 210. Each transfer enable time corresponds to a time when the amount of data loaded in the buffer memory becomes (1−1/n) times all the data of the track to be read. The load amount monitoring unit 14 monitors the load amount of the data of each of the requested and pre-load tracks. Receiving the interrupt signal 12 for the requested track, the data transferring unit 15 of the controller 210 causes a transfer path 107a between the buffer memory 107 and data transferring unit 15 to enter a connected state to transfer the data of the requested track from the buffer memory 107 to the data transferring unit 15 and to the cache memory 213. Thereafter, the data transferring unit 15 disconnects the transfer path 107a. When the data transferring unit 107a receives the interrupt signal 12 for the pre-load track, the transfer path 107a is again set to a connection state to transfer the data of the pre-load track to the cache memory 213 to complete the data transfer.

Figure 17:
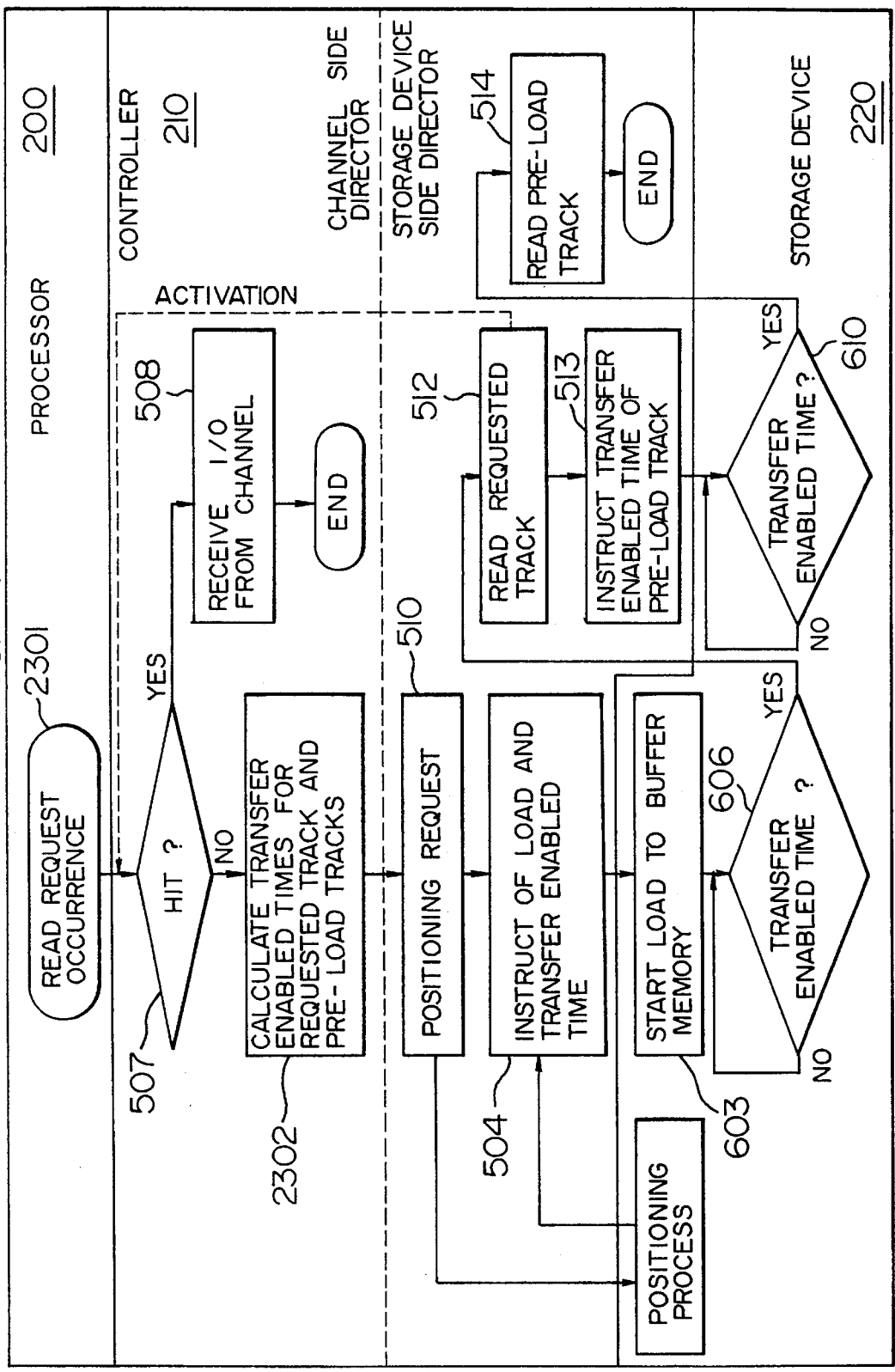
FIG. 17 is a flow chart illustrating the operation of the controller and storage device of the data transfer system of the first embodiment.

FIG. 17 illustrates the flow of the total operation described above. The detailed operation of each system element will be described later with reference to FIG. 5 and other accompanying drawings. The operation of each system element will be described briefly in the following.

When a read request is issued by the processor 200 (Step 2301), the channel side director 211 (FIG. 2) of the controller 210 performs a hit/miss judgement. In the case of a hit, an I/O transfer request for the data from the channel is received to thereafter terminate the operation (Steps 507 and 508). In the case of a miss, the transfer enabled times for the data of the requested and pre-load tracks are calculated (Step 2302) to pass the control to the storage device side director 214 (FIG. 2).

The storage device side director 214 obtains via the directory 212 (FIG. 2) the tracks to be read including the requested and pre-load tracks and the transfer enabled times obtained at the channel side director 211, and then issues a positioning request to the storage device 220 (Step 510) and waits until the positioning is completed. Upon completion of the positioning, the storage device side director 214 instructs a load start to the storage device 220 while supplying the transfer enabled time for the requested track to the storage device 220 (Step 504). Upon reception of the instruction issued at Step 504, the storage device 220 starts loading the data of the designated track or tracks (Step 603). When it becomes the transfer enabled time (Step 606), a transfer enabled interrupt is notified to the controller 210. Upon reception of this interrupt, the controller 210 reads the data of the requested track (Step 512), and then sets the transfer enabled time for the pre-load track (Step 513). When the data of the requested data is read, the channel side director 211 is again activated to receive an I/O transfer request for the data from the channel 203. While the storage device director 214 is reading the data of the requested track, the storage device loads the data of the pre-load track. When it becomes the transfer enabled time for the pre-load track (Step 610), the storage device 220 informs the controller 210 of the interrupt. Receiving this interrupt, the storage device side director 214 reads the data of the pre-load track (Step 514) to terminate the transfer operation.

Figure 10A:
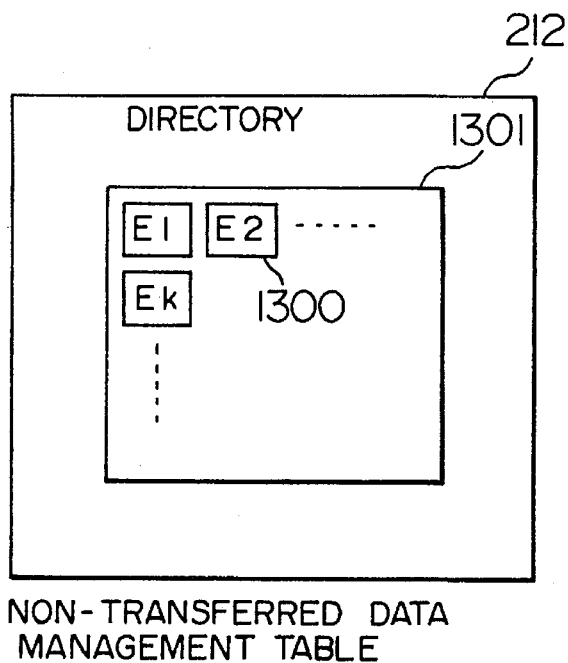
FIG. 10A is an illustrative view showing a non-transferred data management table to be used with the data transfer system according to a third embodiment.

Next, the operation of the controller 210 will be described with reference to FIGS. 5 and 6, and FIG. 10, and the operation of the storage device 220 will be detailed with reference to FIG. 7 and FIG. 16.

The operation flow of the controller 210 will be first described with reference to FIGS. 5 and 6.

Figure 5:
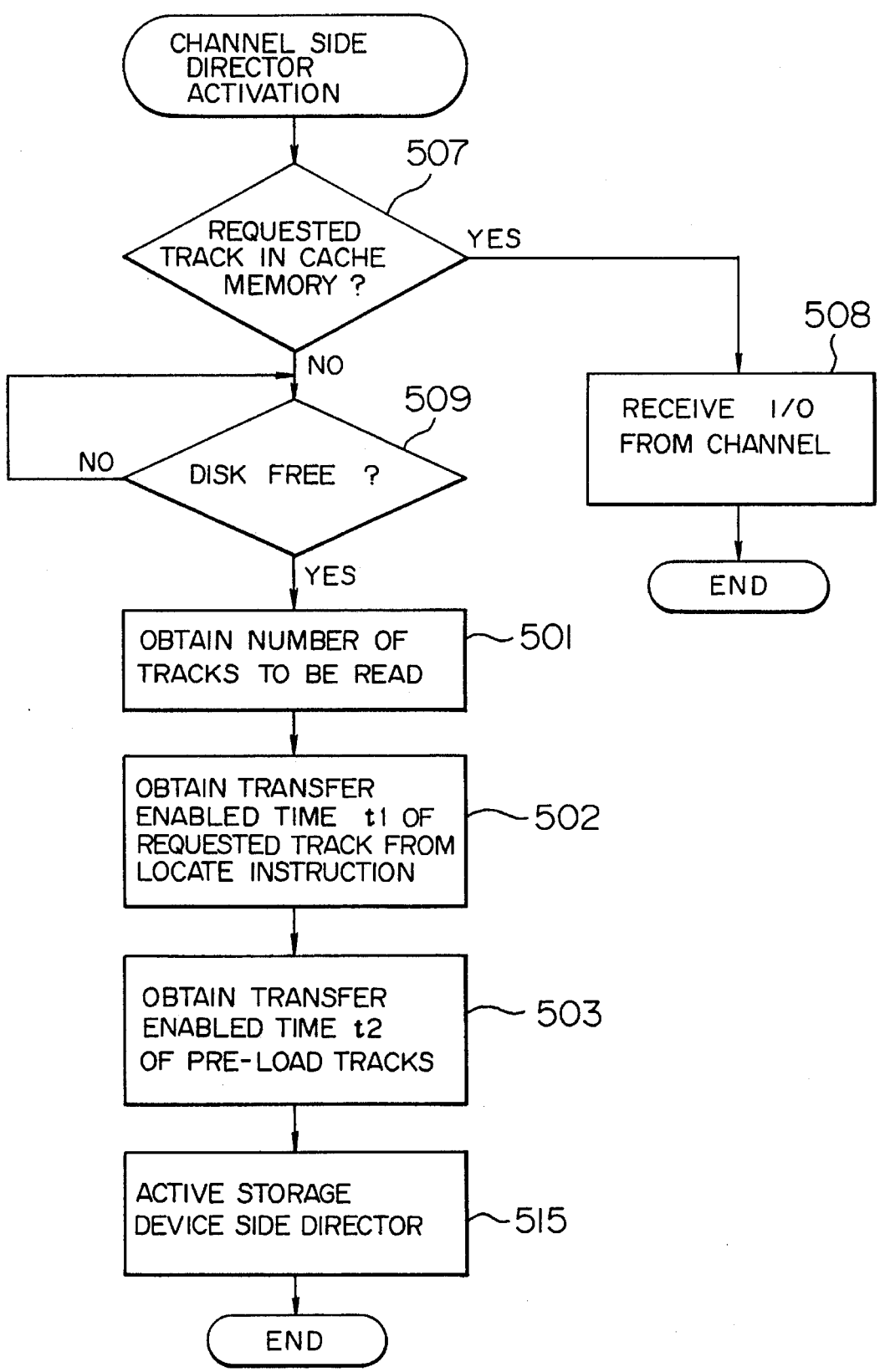
FIG. 5 is a flow chart illustrating the data transfer system of the first embodiment.

FIG. 5 illustrates the operation flow of the channel side director 211 (FIG. 2). When a read request from the channel 203 (FIG. 2) is received, the director 211 is accessed to check whether the data of the requested track is present in the cache memory 213 (FIG. 2) (Step 507). If the data of the requested track is present in the cache memory 213, an access from the channel 203 is acknowledged (Step 508) to complete the data read from the cache memory 213 to the channel 203. If the data of the requested track is not present in the cache memory, the control waits until the storage device becomes available (Step 509), and the size of the requested track and the transfer start time t1 is calculated basing upon the LOCATE instruction from the channel 203 (Step 501). How the transfer enabled time t1 is calculated will be described with reference to the following equations (1) to (5).

$$rpt = t/(g+l) \quad (1)$$

$$rtn = r/rpt \quad (2)$$

$$t1 = (INT(rtn*(1-1/n)), FLT(rtn*(1-1/n)*t/s)) \quad (3)$$

$$ptn = p - rtn \quad (4)$$

$$t2 = (INT(ptn*(1-1/n)), FLT(ptn*(1-1/n)*t/s)) \quad (5)$$

rpt: the number of records per truck
t: track length (byte)
g: gap length (byte)
l: record length (byte)
rtn: the number of requested tracks
t2: transfer enabled time for requested truck
s: sector length (byte)
ptn: the number of pre-load tracks
p: the number of tracks to be read
t2: transfer enabled time for pre-load truck
n: buffer transfer speed/disk transfer speed
r: the number of requested records The LOCATE instruction contains the positioning information of the head 301 as well as other information such as an average record length (byte) 402 (FIG. 4) and the number r of records. The controller is supplied in advance with the length g (byte) of an inter-record gap, a track length t (byte), and a sector length s (byte). Therefore, the number rpt of records per track can be calculated from the equation (1). The number of requested tracks can be obtained therefore from the equation (2). The transfer enabled time t1 for the data of the requested track is represented by the equation (3) which indicates at which sector number of what track the interrupt is to be issued after the start of loading data from the disk 303 to the buffer memory 107. In the equation (3), INT represents an integer part, and FLT represents a fraction part.

At Step 502 shown in FIG. 5, the data length of the pre-load track and its transfer enabled time t2 are obtained in the following manner.

The number of tracks readable in the sequential process by the controller 210 is generally predetermined. Representing this number by p, the number ptn of pre-load tracks is given by the equation (4). The transfer start enabled time t2 for the data of the pre-load track is therefore given by the equation (5).

Steps 601 and 502 correspond to Step 2302 shown in FIG. 17.

After the transfer start enabled times t1 and t2 for the data of the requested and pre-load tracks are calculated (Steps 502 and 503), the channel side director 211 passes the control to the storage device side director 214 to activate it and complete the operation.

Figure 6:
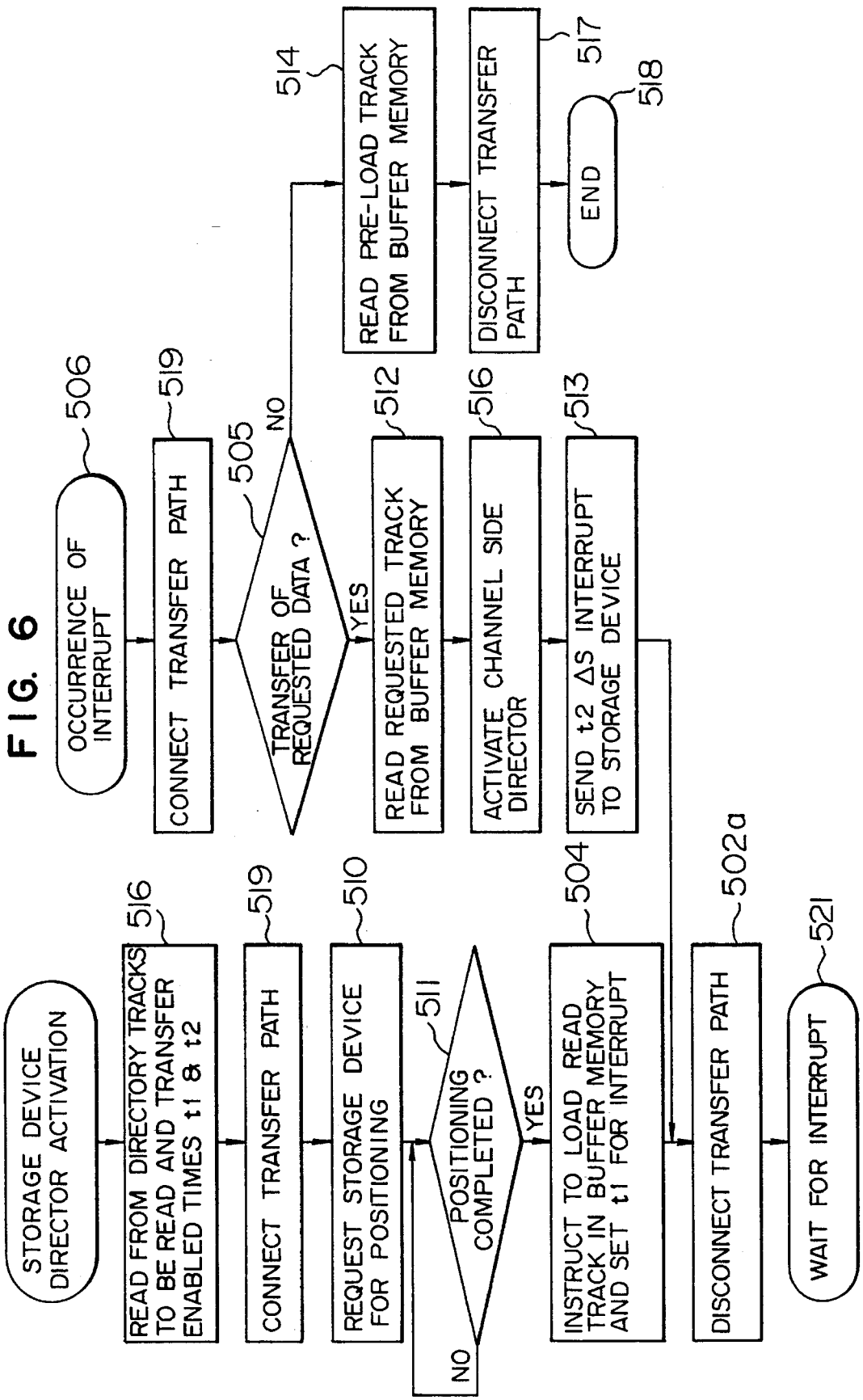
FIG. 6 is a flow chart illustrating the data transfer system of the first embodiment.

FIG. 6 shows the operation flow of the storage device side director 214. When the storage device side director 214 is activated by the channel side director 211 (FIG. 2), the storage device side director 214 obtains the tracks to be read and the transfer enabled times t1 and t2 obtained by the channel side director 211, via the directory 212 (Step 516). Next, the storage device side director 214 connects the storage device 220 to the transfer path 107a (Step 519), and sends the positioning information (cylinder number and head number) of the head 301 to thereafter wait until the positioning of the head 303 is completed (Steps 510 and 511). Upon reception of the positioning completion report from the storage device 220, the controller 210 starts loading the data of p tracks to the buffer memory 107. When the sector of the track set by the transfer enabled time t1 reaches, an interrupt is notified (Step 504). After these operations, the controller 210 disconnects the transfer path 107a to efficiently use it (Step 502a), and the control stands by until the interrupt is sent from the storage device 220 (Step 521).

When an interrupt occurs at Step 506 shown in FIG. 6, the transfer path 107a is connected (Step 519) and it is checked whether the interrupt is for the data transfer of the requested track or for the pre-load track (Step 505). If the interrupt is for the data transfer of the requested track, the data of the requested track is read from the buffer memory 107 (Step 512) and thereafter the channel side director 211 is activated (Step 516) to send the transfer enabled time t2 for the data of the pre-load track (Step 513) and waits for the next interrupt. During this period, an I/O request for the data from the channel 203 can be acknowledged because the data of the requested track has already been loaded in the cache memory 213. When reading the data of the requested track is completed, the channel side director 211 is activated.

when an interrupt for the pre-load track occurs, i.e., if NO at Step 505, the data of the pre-load track is read (Step 514) and the transfer path 107a is disconnected (Step 517) to terminate the transfer operation (Step 518).

Figure 7:
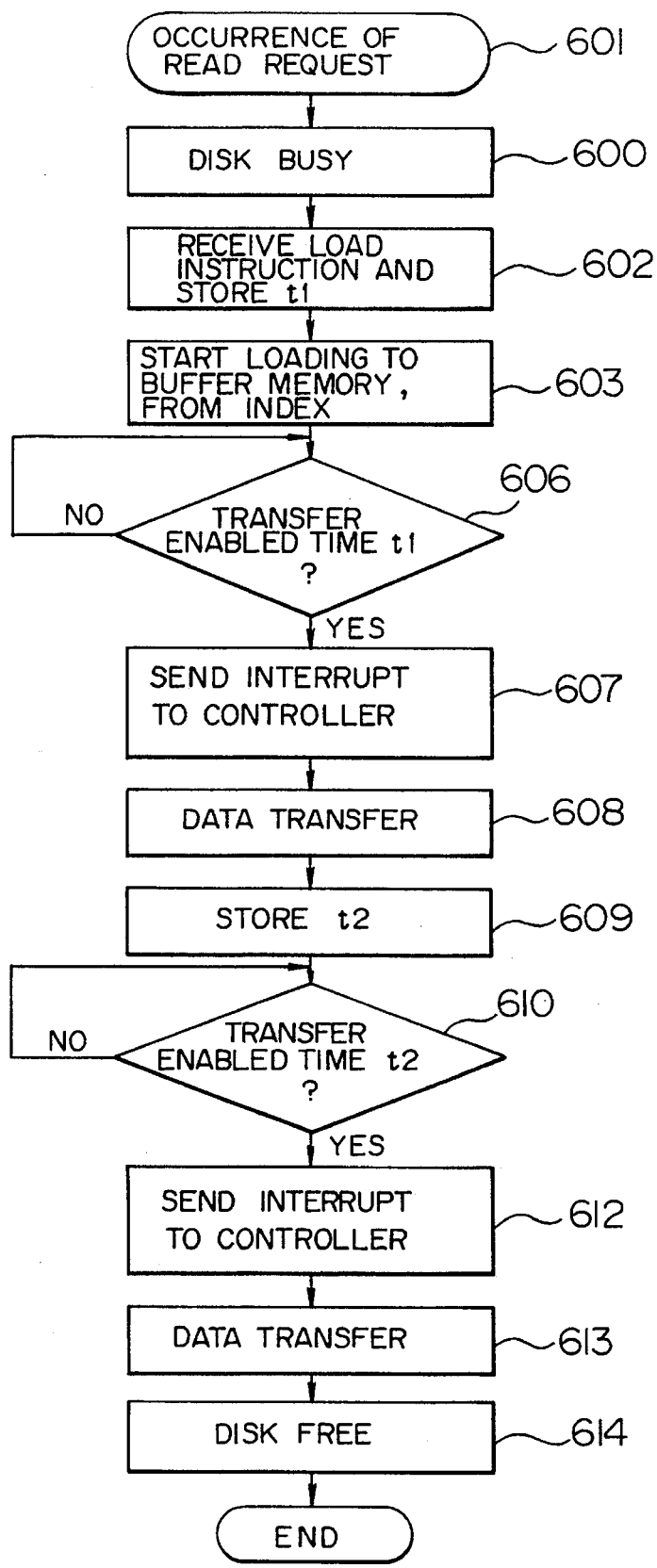
FIG. 7 is a flow chart illustrating the data transfer system of the first embodiment.

The operation flow of the buffer controller 306 is shown in FIG. 7. First, at Step 601 when a read request is issued from the processor 200 relative to the storage device 220, the storage device 220 takes a busy state (Step 600). Up to this time, the positioning of the head 301 to the track 302 of the disk 303 has been settled already. At Step 602, the transfer enabled time t1 for the data of the requested track sent from the controller 210 (at Step 504 in FIG. 6) is loaded in a register (not shown) of the storage device 220. Thereafter, at Step 603, when the index 400 (FIG. 4) of the disk 303 is detected, loading the data of the requested track into the buffer memory 107 starts. The data of the requested track designated by the controller 210 is sequentially loaded while switching the heads 301. When it becomes the transfer enabled time t1 (Step 606), the interrupt signal 12 representing the data transfer enabled state is sent to the controller 210 (Step 607). If this interrupt is acknowledged, the data transfer starts (Step 608). After completion of the data transfer for the requested track, the storage device 220 receives the transfer start enabled time t2 for the data of the pre-load track, and stores it in the register (not shown) of the storage device 220 (Step 609). During this period, the storage device 220 continues loading the data in the buffer memory 107. Next, when it becomes the transfer start enabled time t2 for the pre-load track (Step 610), the interrupt signal 12 representing the data transfer enabled state is sent to the controller 210 (Step 612). If this interrupt is acknowledged, the data transfer starts (Step 613). After completion of the above operations, the storage device 220 is made free (Step 614) to terminate the data transfer operation.

Next, the load amount monitoring unit 14 (FIG. 1) will be described.

Figure 16:
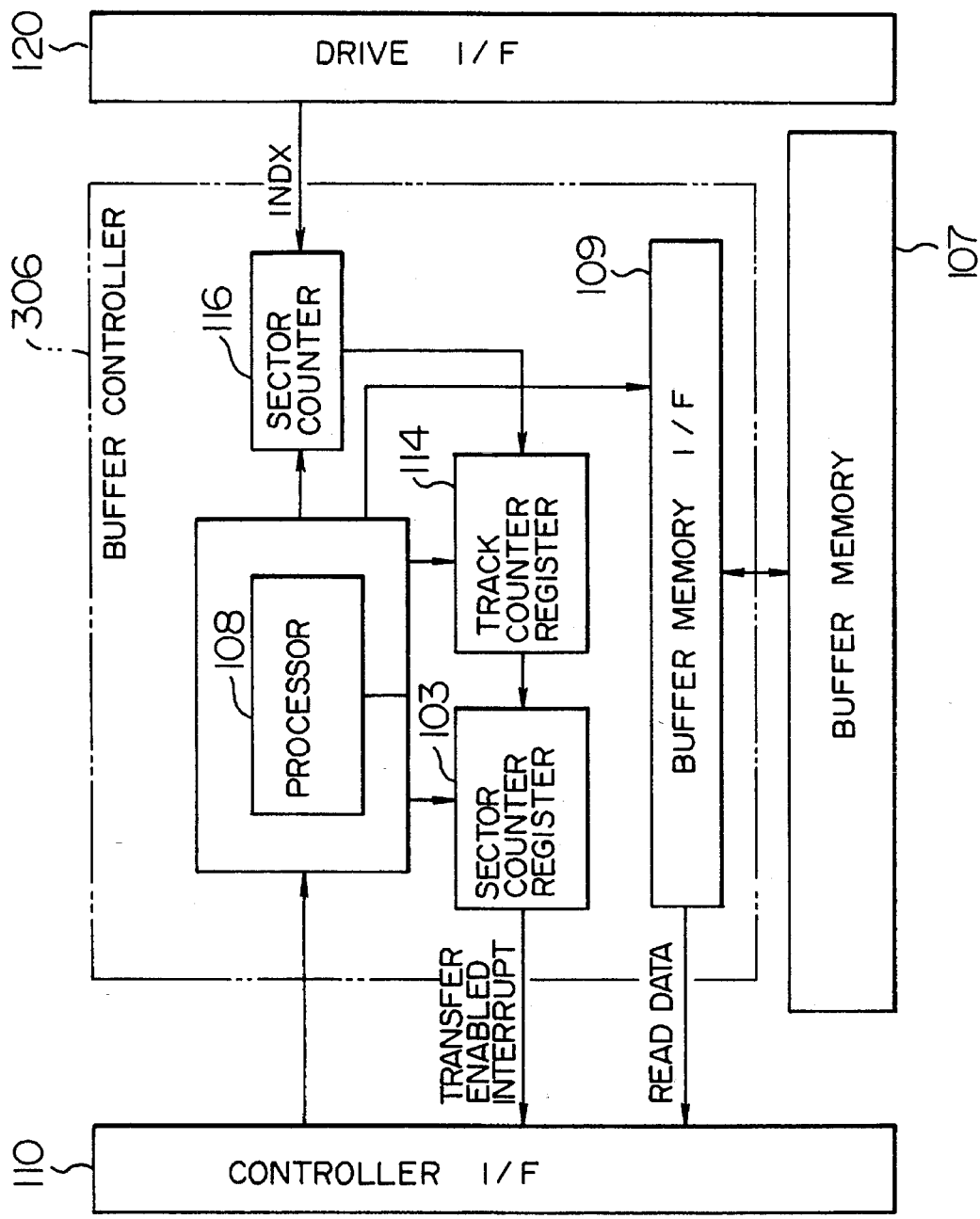
FIG. 16 shows the detail of a buffer controller of the buffered storage device data transfer system according to the present invention.

FIG. 16 shows the outline of the buffer controller 306 in block form. An instruction from the controller 210 and the data transfer from the storage device 220 to the controller 210 are executed via a controller interface 110, whereas an instruction from the buffer controller 306 to the disk 303 and the data transfer from the disk 303 to the buffer memory 107 are executed via a drive interface 120. A processor 108 controls the entirety of the buffer controller 210, issues an instruction to the disk 303, and responds to the controller 210. The buffer memory 107 stores data read from the disk 303. The buffer memory 107 and buffer controller 306 are interfaced by a buffer memory interface 109.

Receiving the track address and transfer enabled time indicated by the track address and sector number, from the controller 210, the processor 108 stores the track address in a track counter register 114, and the sector number in a sector counter register 103. A sector counter 116 starts counting the number of sectors basing upon the information supplied via the drive interface 120 after the index (refer to FIG. 4) is detected. The sector counter 116 decrements its content each time it counts one sector. Each time the value of the sector counter 116 reaches 0, the value of the track counter register 114 decrements its value. When the value of the track counter register 114 reaches 0, it means that the head has reached the track whose data is to be transferred. Thereafter, each time the value of the sector counter 116 is decremented by 1, the value of the sector counter register 103 is decremented by 1. When the value of the sector counter register 103 reaches 0, the transfer enabled interrupt signal 12 is sent from the sector counter register 103 to the data transferring unit 15 of the controller 210 via the controller interface 110 and interrupting unit 13 (FIG. 4). Upon reception of the interrupt signal 12 from the storage device 220, the data transferring unit 15 reads the data from the buffer memory 107 via the controller interface 110 and buffer memory interface 109.

Figure 8:
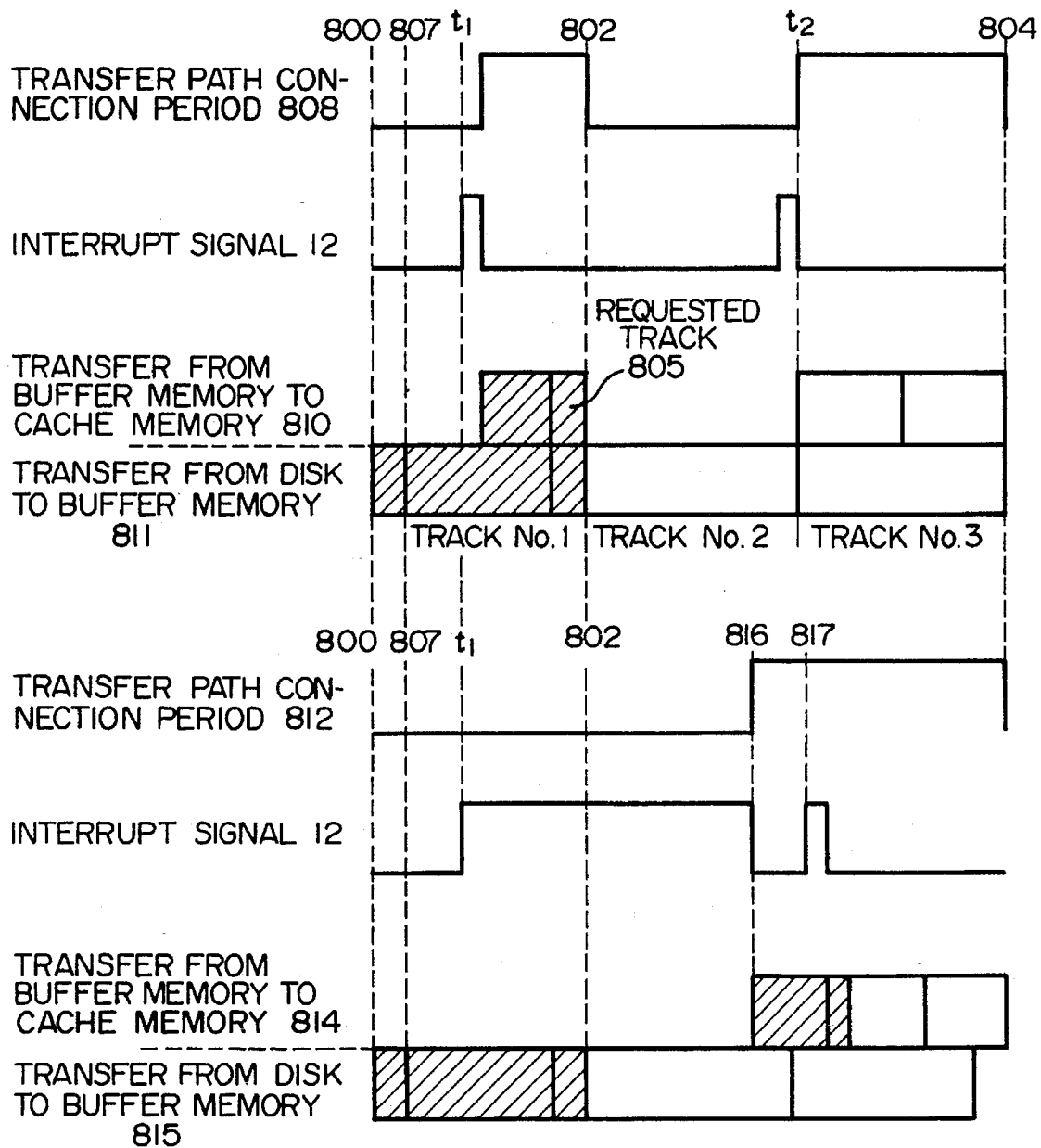
FIG. 8 is a timing chart of data transfer in the data transfer system of the first embodiment.

FIG. 8 is a timing chart of data transfer in the sequential data read described above. In this timing chart, it is assumed that the size n of the data of pre-load tracks is two tracks, and the data transfer speed ratio 1/n of the disk 303 to the buffer memory 107 is ½. The upper chart shown in FIG. 8 will be described first. Loading data from the disk 303 to the buffer memory 107 starts at time 800. The sector counter register 103 starts at time 807 when a set sector signal is detected. When it becomes the transfer start enabled time t1 at time 801 for the transfer of the data of the requested track, the interrupt signal 12 is sent from the interrupting unit 13 to the data transferring unit 15. If the data transferring unit acknowledges the interrupt, the transfer path 107a is set to the connection state to start transferring the data of the requested track from the buffer memory 107 to the cache memory 213. The period 808 while the buffer memory 107 and the data transferring unit 15 are interconnected together is from time 801 to time 802. When the data of the requested track is transferred, the transfer path 107a is disconnected until it becomes the transfer enabled time t2 for the data of the next pre-load track. At the transfer enabled time t2, the interrupt signal 12 is sent to the data transferring unit 15 to transfer the data of the pre-load track in the same manner described above. As seen from the lower chart of FIG. 8, loading the data of the requested track from the buffer memory 107 to the cache memory 213 and transferring the data of the pre-load track from the disk 303 to the buffer memory 107 both terminate at the same time 802. The transfer path 107 between the cache memory 213 of the controller 210 and the buffer memory 107 of the storage device 220 is used always at the transfer speed of the buffer memory 107.

Even if the interrupt signal 12 is issued when it becomes the transfer enabled time t1 for the storage device 220, the data transferring unit 15 of the controller 210 will not necessarily acknowledge the interrupt signal. This case will be described with reference to FIG. 9 which assumes that although the interrupt signal 12 was issued at time 801, the data transferring unit 15 of the controller 210 did not acknowledged the interrupt signal 12 until time 816. In this case, after the interrupt signal 12 was issued at time 801, it is maintained turned on until the data transferring unit 15 of the controller 210 acknowledges it. As a result, since the data read from the disk 303 is accumulated in the buffer memory 107, there occurs no rotation wait of the disk 303. When the data transferring unit 15 of the controller 210 acknowledges the interrupt signal 12 at time 816, the data transfer from the buffer memory 107 to the cache memory 213 starts and terminates at time 817. Immediately thereafter, the buffer controller 306 receives the transfer enabled time t2 from the transfer enabled time calculating unit 17. At this time, the value of the sector counter register 103 (FIG. 16) has exceeded the transfer enabled time t2, so that the data of the pre-load track is transferred immediately.

Figure 15A:
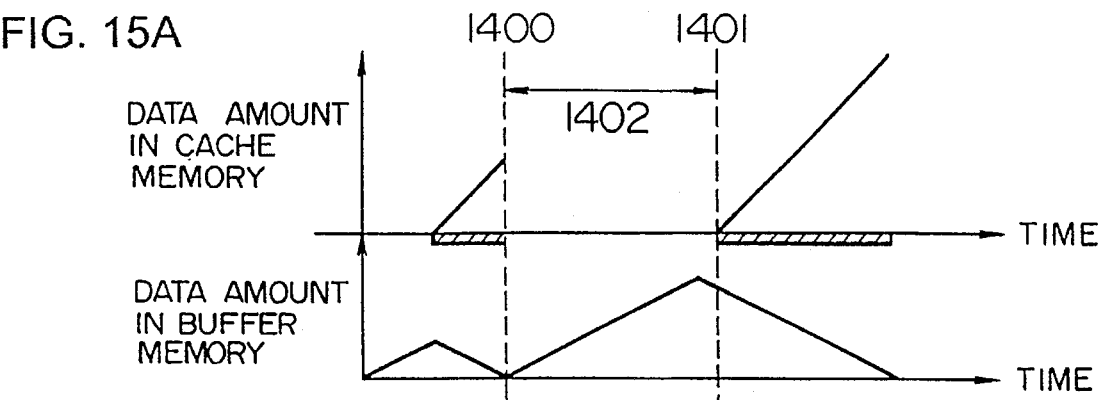
FIG. 15A is a graph of the data transfer system of the first embodiment.
Figure 15B:
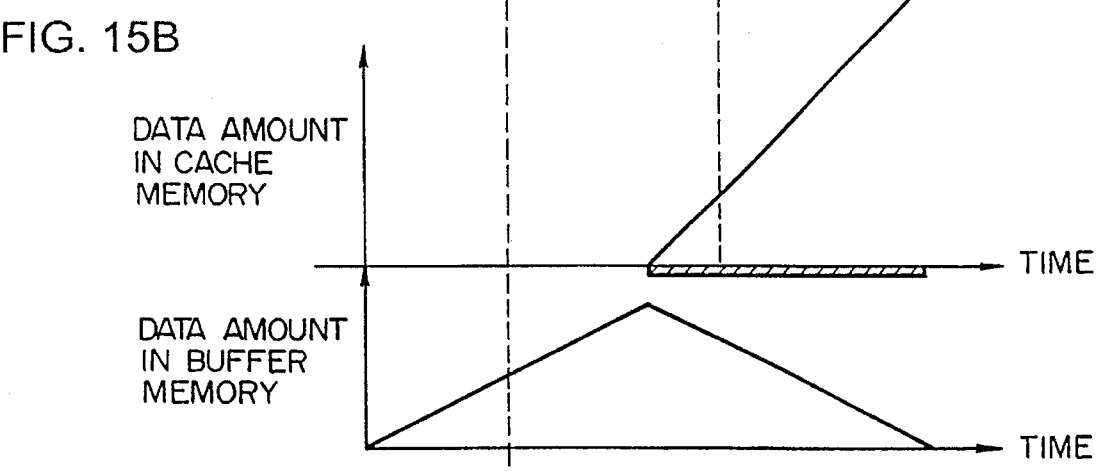
FIG. 15B is a graph of the conventional data transfer system.
Figure 15C:
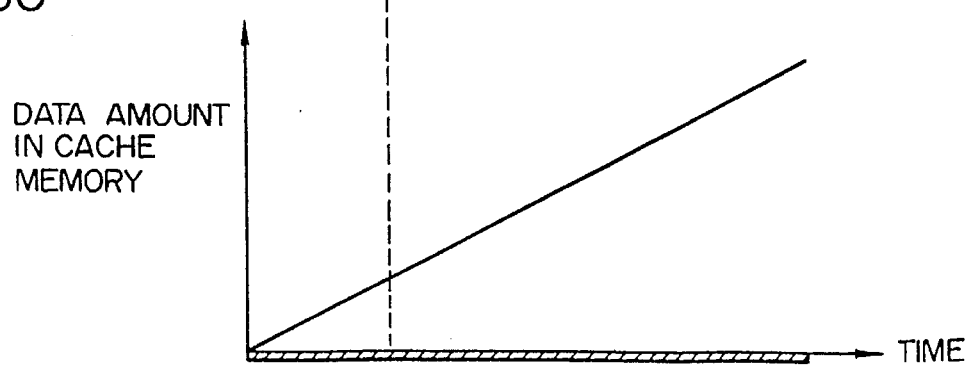
FIG. 15C is a graph of the data transfer system in which the storage device has no buffer memory.

The comparison of the data transfer of the present invention with a conventional data transfer will be described with reference to FIGS. 15A, 15B and 15C. The graph shown in FIG. 15A stands for the data transfer system of the present invention, the graph shown in FIG. 15B stands for the conventional data transfer system, and the graph shown in FIG. 15C stands for the data transfer system in which the storage device 220 has no buffer memory 107. In each graph, the abscissa represents time. Loading data from the disk 303 to the buffer memory 107 starts at time 0. The upper section of the ordinate represents the data amount in the cache memory 213, and the lower section represents the data amount in the buffer memory 107. In each graph, the data transfer speed of the buffer memory 107 is set to a twofold of that of the disk 303. With respect to the graph shown in FIG. 15A, when half of the data of the requested track is loaded in the buffer memory 107, the data transfer to the cache memory 213 of the controller 210 starts, and the transfer path 107a is temporarily disconnected at time 1400 when the data of the requested track is transferred. With respect to the graph shown in FIG. 15C, the data transfer for the requested track will not be delayed while continuing loading the data from the disk 303 of the storage device 220 to the cache memory 213, and the data of the pre-load track starts being transferred at time 1401 from the disk 303 to the cache memory 213. With respect to the graph shown in FIG. 15C, although the data of the requested track has been loaded up to time 1401, this data transfer is delayed by a time duration 1402 as compared with the graphs shown in FIGS. 15A and 15C. The period while the transfer path 107a is occupied in the cases of the graphs shown in FIGS. 15A and 15B is half that in the case of the graph shown in FIG. 15C. In summary, although the occupied period of the transfer path 107a in the case of the graph shown in FIG. 15B is half that in the case of the graph shown in FIG. 15C, the response time of the data of the requested track is delayed, whereas the response time of the data of the requested track is generally the same both in the cases of the graphs shown in FIGS. 15A and 15C and the occupied period of the transfer path 107a in the case of the graph shown in FIG. 15A is half that in the case of the graph shown in FIG. 15C.

Next, the second embodiment of the data transfer system for buffered storage devices will be described. The characteristic feature of the second embodiment is as follows. In the case where a data read instruction from the processor 200 to the controller 210 is not a sequential read instruction, i.e., in the case where the data requested to be read by the processor is fully contained in the requested track only, the data requested to be read and the following data within the requested track are collectively transferred from the disk 303 to the buffer memory 107. During the data transfer to the buffer memory 107, the data in the requested track is transferred from the buffer memory 107 to the cache memory 213 and thereafter to the cache memory 213.

In the second embodiment, the number of records to be pre-loaded is small and contained as part of the requested track. Therefore, even if the data of the requested track data and pre-load track data are collectively transferred to the controller 210, there is less response delay of the track data requested by the processor 200. The size of the pre-load track is half a track in average. The delay of the track requested to be read by the processor 200 is therefore a quarter of one track, and half a track at the maximum. From the viewpoint of data transfer overhead, it is more efficient to transfer the requested track data and pre-load track data collectively from the buffer memory 107 to the cache memory 213 of the controller 213.

Figure 18:
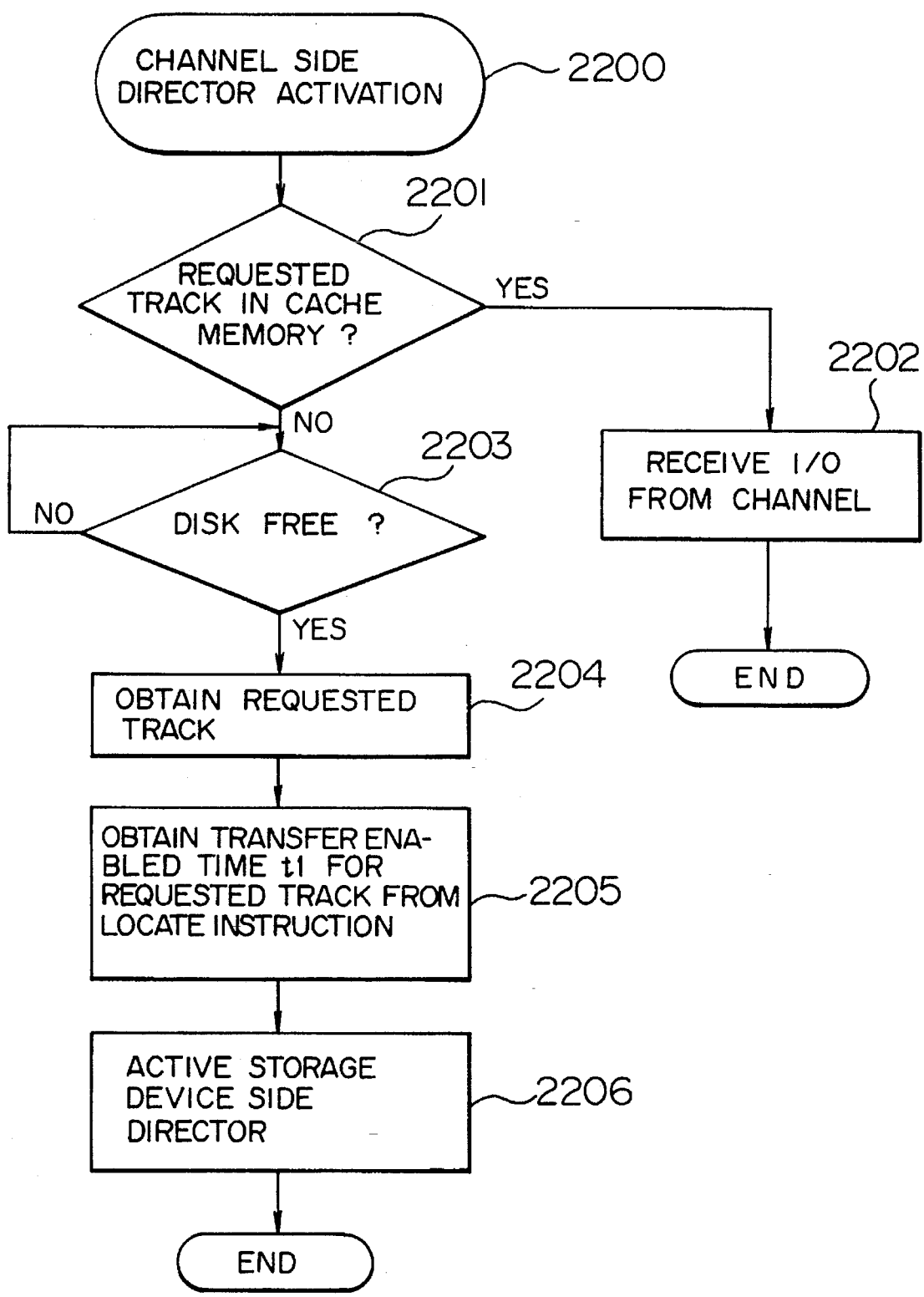
FIG. 18 is a flow chart showing the operation of receiving a read request.
Figure 19:
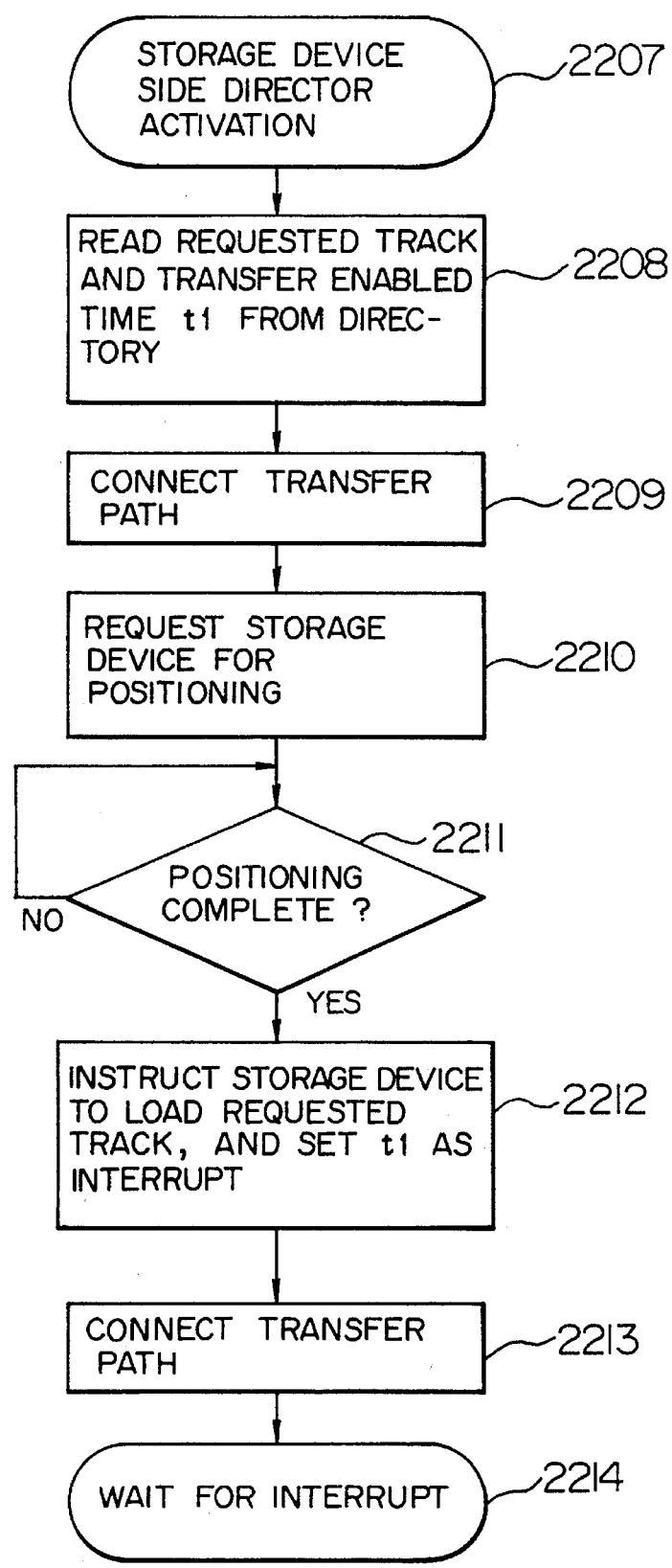
FIG. 19 is a flow chart showing the operation of storage device side director.
Figure 20:
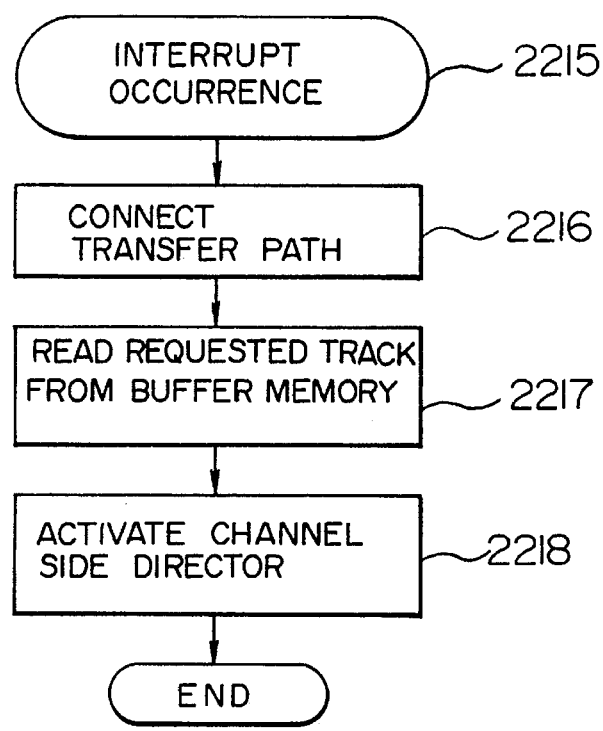
FIG. 20 is a flow chart showing the operating of interruption.

Referring to FIGS. 18 to 20, the operation of the controller 210 according to the second embodiment will be described. First, with reference to FIG. 2, when the channel side director 211 receives a read request which is not a sequential read request (Step 2200), it is checked whether there is a cache hit (Step 2201). In the case of a hit, a data transfer I/O request by the processor 200 is acknowledged (Step 2202). In the case of a miss-hit, it is waited until the buffer memory 107 of the storage device 220 becomes free at step 2203. The requested track is obtained at Step 2204, and the transfer enabled time t1 for the requested track is obtained at Step 2205. These are obtained in the same manner as described with the equation (3). At Step 2206, the storage device side director 214 is activated to terminate the operation of the controller 210.

Referring to FIG. 19, when the storage device side director 214 is activated (Step 2207), the requested track and transfer enabled time t1 are read from the directory 212 (FIG. 2) at Step 2208. At Step 2209 the transfer path 107a is made to enter a connection state, and the positioning request is issued to the head 301 of the disk 303 of the storage device 220 (Step 2210) to thereafter wait until the positioning for the head 301 is completed (Step 2211). When the positioning for the head 301 is completed, the buffer controller 306 instructs the load amount monitoring unit 14 so as to load the data of the requested track from the disk 303 to the buffer memory 107, and the transfer enabled time t1 is sent from the transfer enable time calculating unit 17 to the buffer controller 306 (Step 2212). Next, at Step 2213, the transfer path 107a is disconnected to wait for an interrupt issued from the interrupting unit 13 to the data transferring unit 15 (Step 2214).

Referring to FIG. 20, when the interrupt signal 12 is generated (Step 2215), the transfer path 107a is again connected (Step 2216) to read the data of the requested track from the buffer memory 107 (Step 2217). At this time, since the data of the requested track has already been loaded in the cache memory 213, the channel side director 211 is activated (Step 2218) and the transfer path 107a is disconnected.

The operation of the storage device 220 is the same as the first embodiment, and so the description thereof is omitted.

Figure 9:
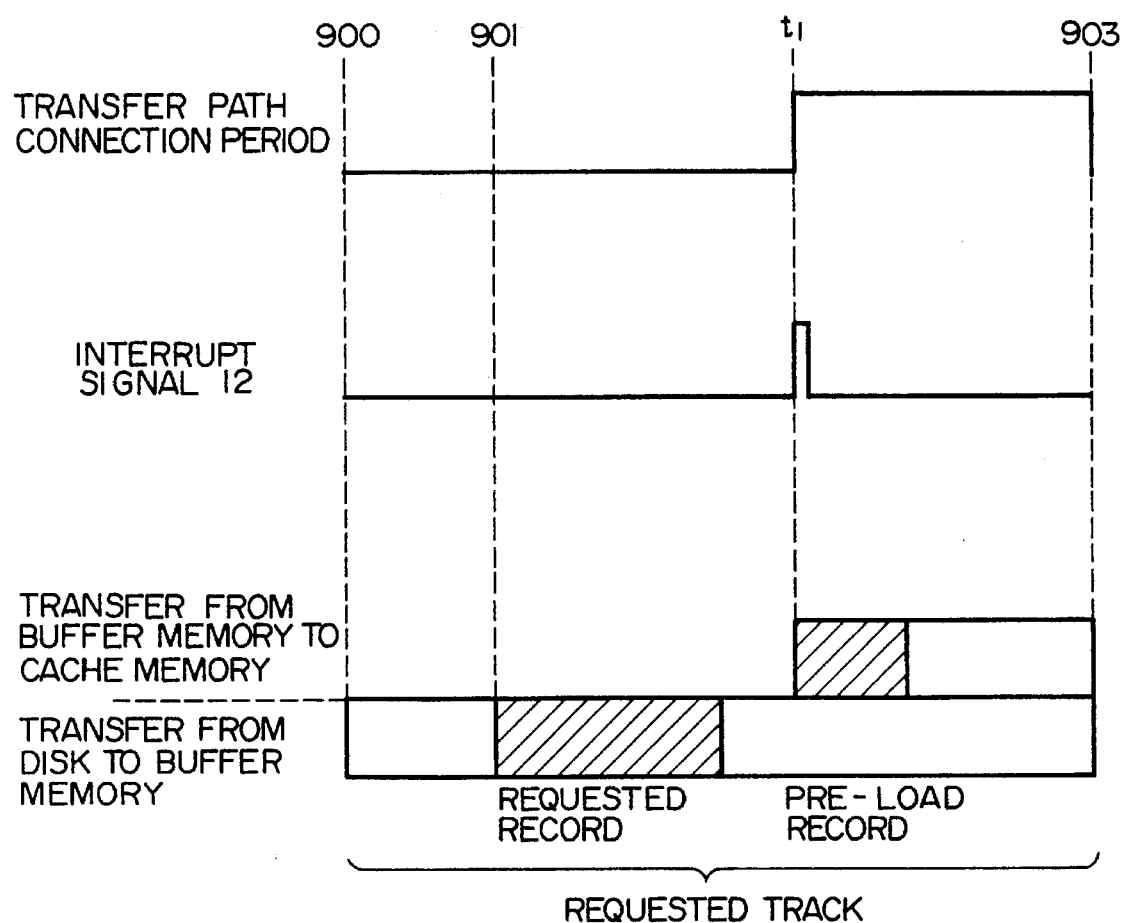
FIG. 9 is a timing chart of data transfer of the data transfer system according to a second embodiment.

The data transfer system of the second embodiment will be described with reference to the data transfer timing chart shown in FIG. 9. In this example, the requested record in the requested track is indicated at hatching areas, and the pre-load record in the requested track is indicated at blank areas.

On the storage device 220 side, after the positioning for the head 301 of the disk 303 is completed, loading data into the buffer memory 107 starts at time 900 from the index (refer to FIG. 4) at the top of the track. When it becomes the transfer enabled time t1, the interrupting unit 13 of the storage unit 220 sends the interrupt signal 12 to the data transferring unit 15 of the controller 210. If the interrupt is accepted, the interrupt signal 12 is turned off. The controller 210 connects the transfer path 107a to read the data from the buffer memory 107 and complete the data write to the cache memory 213 at time 903. As seen from FIG. 9, although the transfer of the data of the requested record to the cache 213 is delayed, this delay is a quarter of one rotation in average, and a half the rotation at the maximum.

Next, the third embodiment of the data transfer system for buffered storage devices will be described. The characteristic feature of the third embodiment is as follows. In the first embodiment, the data of the requested track and pre-load tracks is transferred twice from the disc 303 to the buffer memory 107 and to the cache memory 213, increasing the overhead. In view of this, the data of the requested track and pre-load tracks is transferred by a single connection of the transfer path 107a. Namely, as in the case of the first embodiment, the data of the requested track and pre-load tracks is transferred from the disk 303 to the buffer memory 107, and at the transfer enabled time t1 the data of the requested track in the buffer memory 107 is transferred to the cache memory 213 without transferring the data of the pre-load tracks following the requested track to the cache memory 213. Immediately after the transfer of the data of the requested track by the next read instruction to the cache memory 213, the data of the previous pre-load tracks is transferred from the buffer memory 107 to the cache memory 213. Such data of the requested tracks are transferred to the processor 200.

Figure 10B:
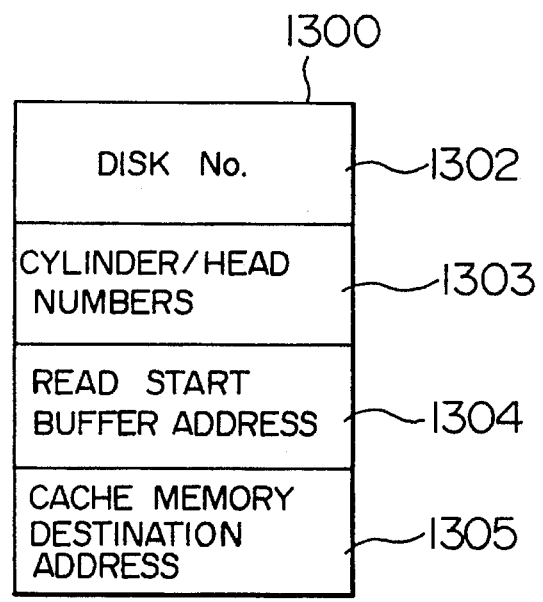
FIG. 10B is an illustrative view showing entries of the non-transferred management table to be used with the data transfer system of the third embodiment.

In order of realizing the third embodiment, non-transferred data management tables 1301 are stored in the directory 212 (FIG. 2) of the controller 210. The non-transferred data management table 1301 is provided for each storage device 220 (FIG. 2). Each non-transferred data management table 1301 has entries 1300 corresponding in number to the maximum number of the storage devices 220. As shown in FIG. 10B, each entry includes a disk number 1302, cylinder/head numbers 1303, a read start buffer memory address 1305, and a cache memory storage destination address 1305. The disk number 1302 represents the number of the storage device 220 which stores the data not transferred to the controller 210. The cylinder/head address 1303 represents the track address of the data. The read start buffer memory address 1304 represents the address of the data in the buffer memory 107, this address being calculated as the last address of the previous requested track added by 1. The cache memory storage destination address 1305 represents the address of the data in the cache memory 213 of the controller 210 transferred from the storage device 220, this address being calculated as the last storage destination address of the previous requested track added by 1. The non-transferred data management table 1301 is generated after the controller 210 receives the requested track information, and stored in the directory 212.

Figure 11:
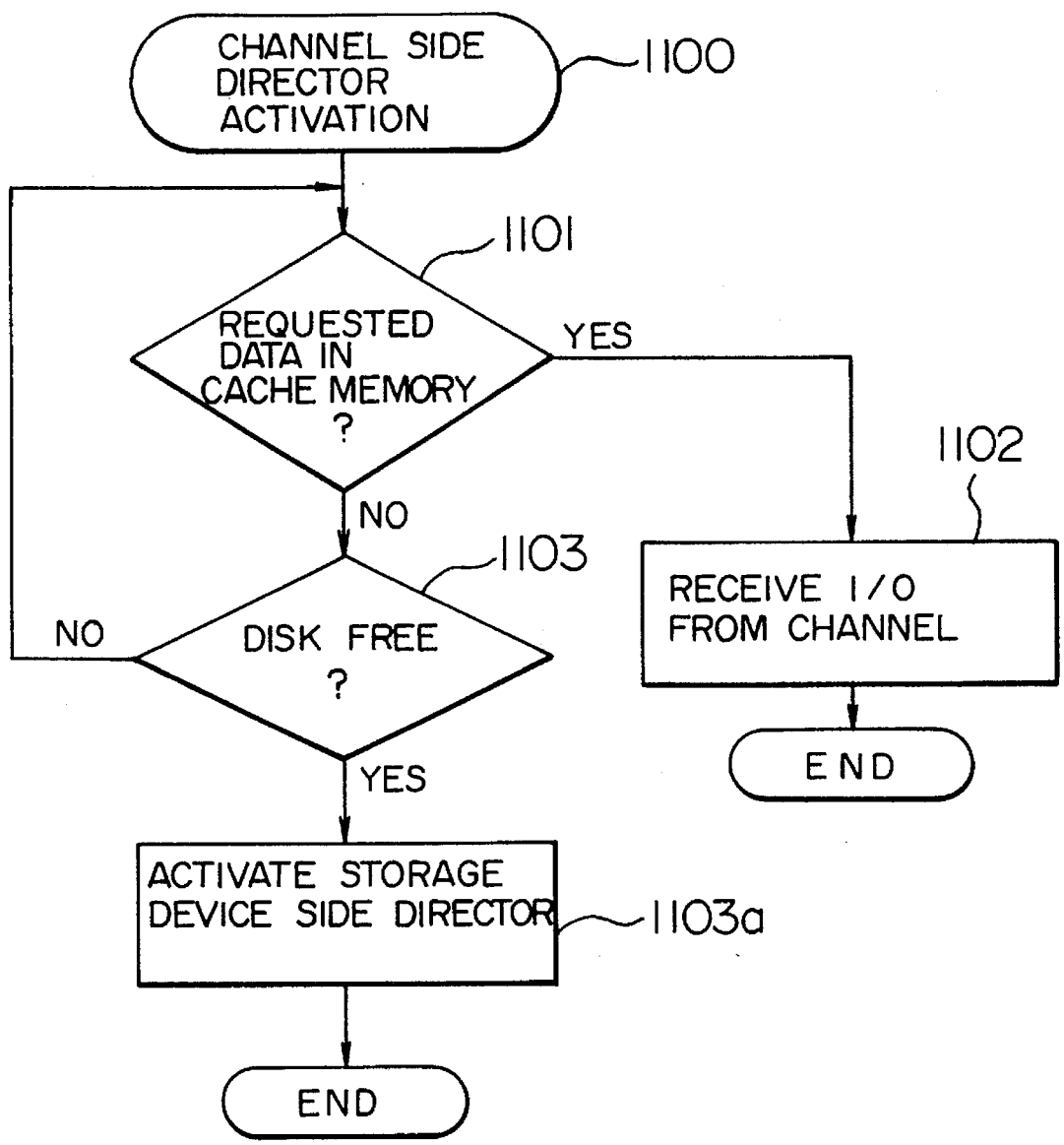
FIG. 11 is a flow chart illustrating the data transfer system of the third embodiment.

The controller 210 of the third embodiment will be described with reference to the operation flows shown in FIGS. 11 and 12. When a read request is issued from the channel 203 (FIG. 2) (Step 1100), the controller 210 accesses the directory 212 (FIG. 2) to check whether the data of the requested track is present in the cache memory 213 (Step 1101). If present or hit, the data is transferred from the cache memory 213 to the channel 203 (Step 1102) and the transfer operation is terminated. In the miss-hit of the cache memory 213, it is checked whether the storage device 220 is free (Step 1103). If not free, the control returns back to Step 1101 to check whether there occurs a hit of the cache memory 213. If the storage device is free, the storage device side director 214 is activated (Step 1103a).

The busy case of the storage device 220 occurs when a data load 1201 for the pre-load tracks of the previous read request 1203 is not still completed at the time when a read request 1200 is issued by the channel 203. Succeedingly after the completion of a transfer 1202 of the requested data from the buffer memory 107 to the cache 213 of the controller 210, a transfer 1204 of the data of the pre-load tracks is executed. The pre-load tracks of this data transfer 1204 are the pre-load tracks for the read request issued before the read request 1203. The requested track by the read request 1200 may possibly be the pre-load track 1204. There is therefore a possibility that the data of the requested track has already been stored in the cache memory 213 when a completion report 1207 is returned. For this reason, it is necessary to check, when the storage device 220 is busy, whether the data is present in the cache memory 213.

Figure 12:
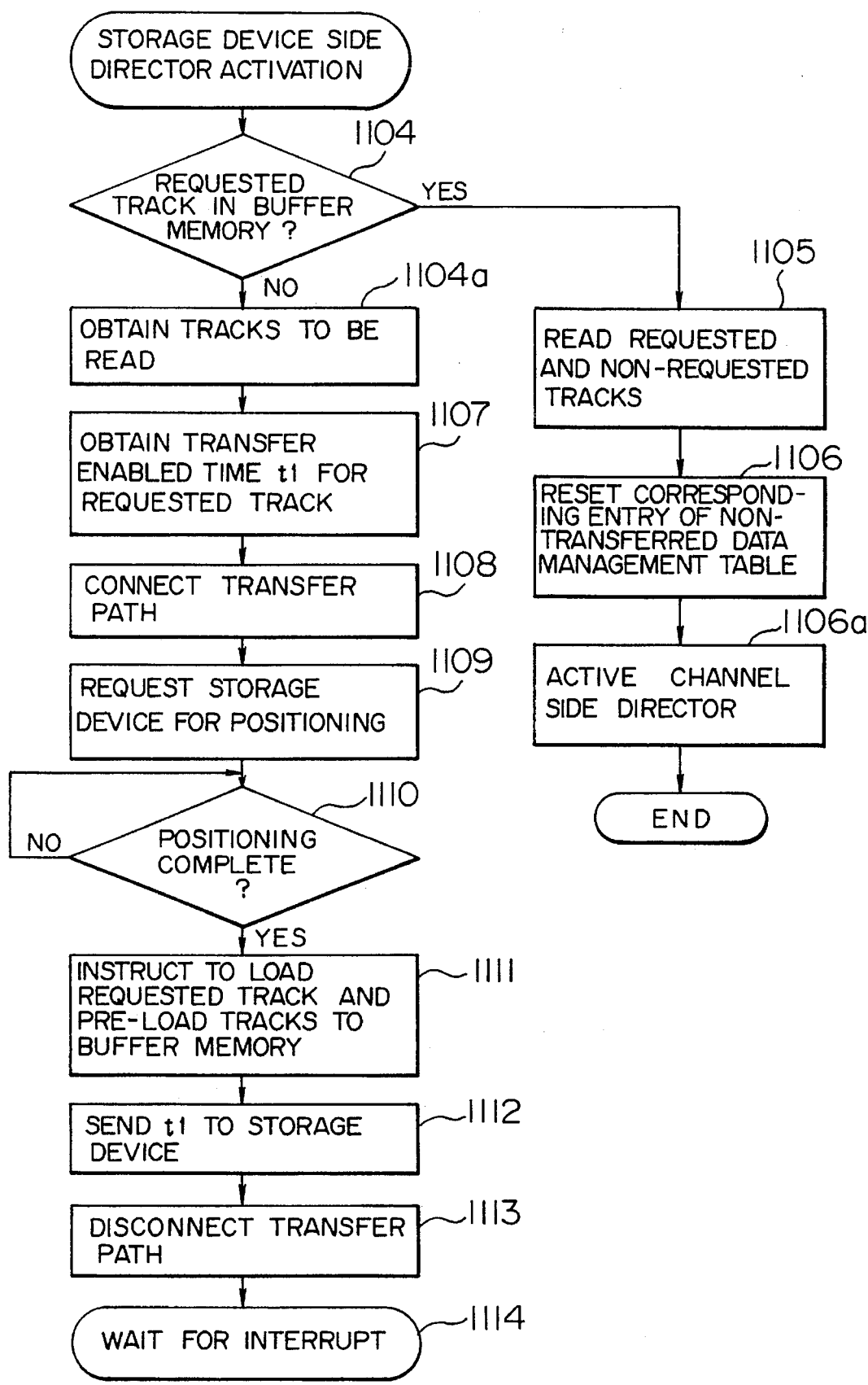
FIG. 12 is a flow chart illustrating the data transfer system of the third embodiment.

As shown in FIG. 12, if the storage device 220 is free, it is checked at Step 1104 whether there is a hit of the buffer memory 107, by referring to the entry 1300 (FIG. 10A) of the non-transferred data management table 1301 corresponding to the storage device 220 from which the data is read. A hit of the buffer memory 107 may occur if the present requested track is the previous pre-load track. If there is no hit of the buffer memory 107, the storage device 220 is free and the data of the requested track and pre-load tracks has already been loaded in the buffer memory 107. In this case, therefore, the data of the pre-load tracks is read (Step 1105). The data still not transferred is no more present at this time. All the items except the disk number in the corresponding entry 1300 are cleared at Step 1106. Thereafter, the channel side director is activated (Step 1106a).

If there is a miss-hit of the buffer memory 107 at Step 1104, the tracks to be read are obtained (Step 1104a) to calculate the transfer enabled time t1 of the requested track (Step 1107), and the transfer path 107a is connected (Step 1108). The positioning information for the head 301 is sent to the storage device 220 to position the head 301 (Step 1109) and wait for the completion of the positioning (Step 1110). Upon completion of the positioning, it is instructed to load the data of k (k≧1) tracks to the buffer memory 107 (Step 1111) and set the transfer enabled time to t1 (Step 1112). Thereafter, the transfer path 107a is disconnected to wait for the occurrence of the interrupt (Step 1114).

Figure 13:
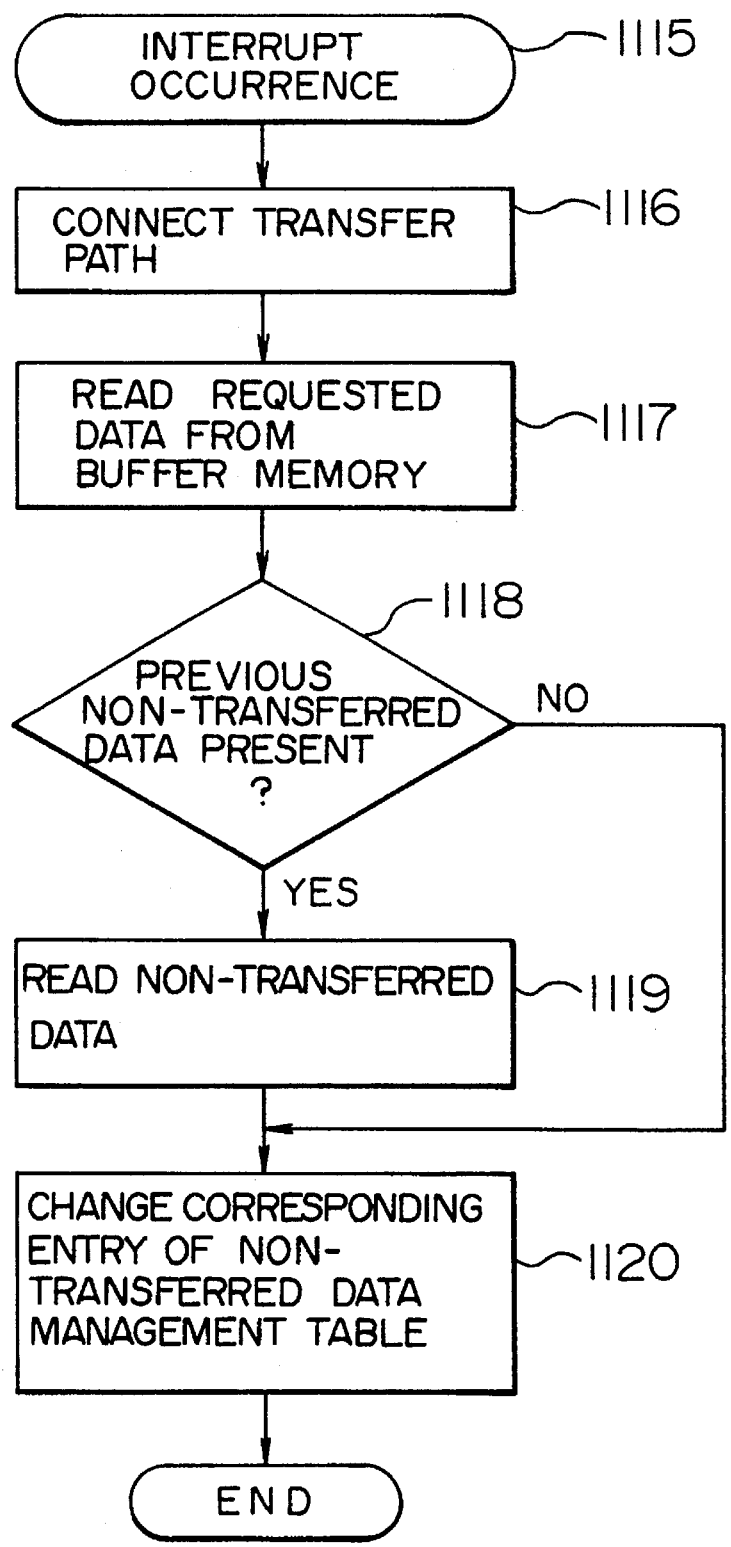
FIG. 13 is a flow chart illustrating the data transfer system of the third embodiment.
Figure 14:
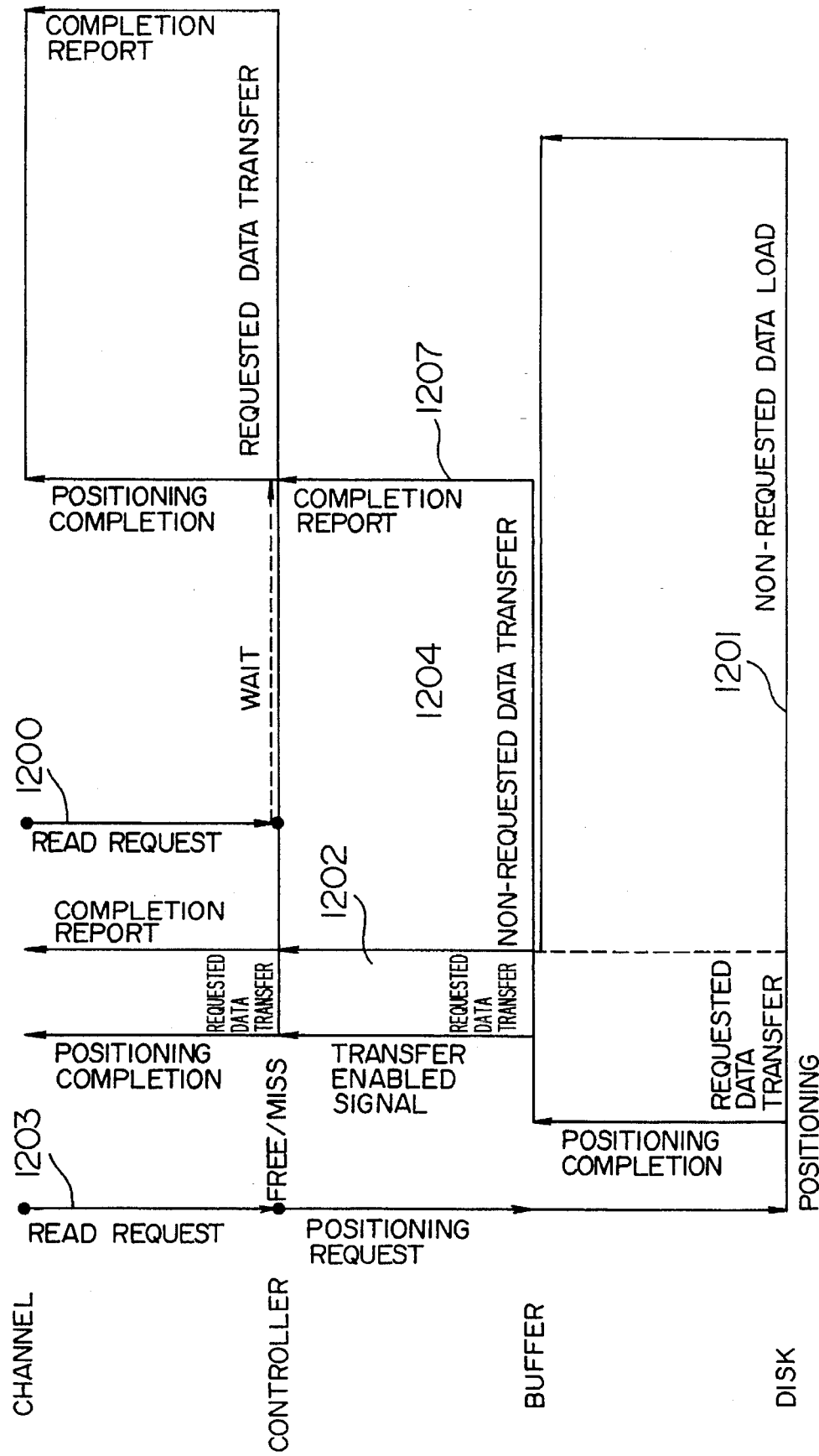
FIG. 14 is a timing chart of data transfer in the data transfer system of the third embodiment.

When the interrupt occurs at Step 1115 shown in FIG. 13, the transfer path 107a is connected (Step 1116) to read the data of the requested track from the buffer memory 107 (Step 1117). It is then checked from the corresponding entry 1300 of the non-transferred data management table 1301 (FIG. 10A) whether there is previous data still not transferred (Step 1118). If there is non-transferred data, it is read (Step 1119). At Step 1120, the cylinder/head numbers 1303 (FIG. 10B), read start buffer memory address 1304 (FIG. 10B), and cache memory destination address 1305 (FIG. 10B), respectively of the present non-transferred data (i.e., present pre-load track), are set to the entry 1300 (Step 1120). If there is no previous non-transferred data at Step 1118, the process of Step 1120 is executed to terminate the transfer operation.

From the above description it is seen that the data of the requested track by a read request from the processor and the data of the pre-load tracks by a previous read request from the processor can be transferred collectively by a single connection of the transfer path 107a. Accordingly, it is possible to reduce the overhead of connecting the transfer path 107a and realize a high efficiency of the system.

The fourth embodiment of the data transfer system for buffered storage devices will be described. The characteristic feature of the fourth embodiment is as follows. Similar to the first embodiment, the data of the requested track and pre-load tracks is loaded from the disk 303 to the buffer memory 107. If the overhead of connecting the transfer path 107a is small, the data loaded in the buffer memory 107 is transferred to the cache memory 213 for each of the requested track and pre-load tracks, and to the processor 200.

Figure 21:
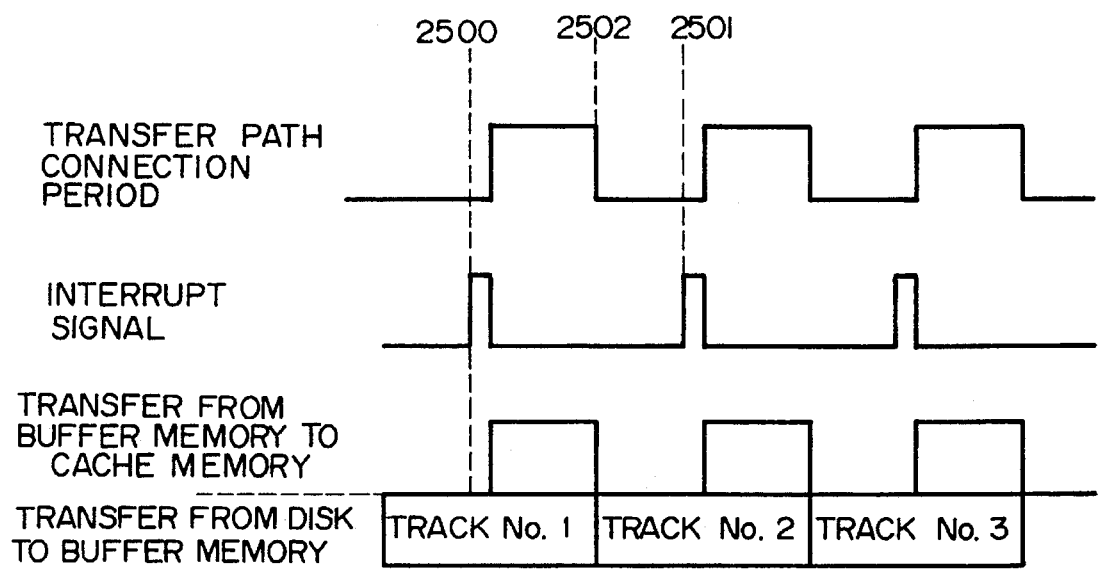
FIG. 21 is a timing chart of data transfer of the data transfer system of a fourth embodiment.

As shown in the data transfer timing chart of FIG. 21, the data transfer to the controller 210 is executed separately for each track in the fourth embodiment. Namely, when half the data of one track is loaded from the disk 303 to the buffer memory 107, the data of the track is transferred to the controller 210. This operation is effective if the overhead of connecting the transfer path 107a between the controller 210 and storage devices is small.

The fourth embodiment will be described with reference to FIG. 21. The controller 210 first calculates the transfer enabled time t1 for each of tracks. For the transfer enabled time t1, the sector of the track to be read is selected which satisfies the following equation.

$$(1-n)*t/s \qquad (6)$$

The controller requests the storage device 220 to load the data of all tracks to be read, and sends the sector number of track No. 1 satisfying the equation (6) to the storage device 220. When the designated sector of track No. 1 reaches after the start of the data load, the storage device 220 sends the interrupt signal 12 to the controller 210. Upon reception of the interrupt signal 12, the controller 210 reads the data for track No. 1. When the data read is completed, the sector number of next track No. 2 satisfying the equation (6) is sent to the storage device 220 to wait for the next interrupt signal 12. During this period, the storage device 220 continues loading the data. When the designated sector of track No. 2 reaches, the interrupt signal 12 is sent to the controller at time 2501. Upon reception of the interrupt signal 12, the controller 210 reads the data for track No. 2. Similar operations are performed for track No. 3 to read the data of all the requested tracks and thereafter the transfer operation is terminated.

In the fourth embodiment, under the condition of a small overhead of connecting the transfer path 107a between the controller 210 and storage devices 220, the response delay to the channel 203 is made shorter than the first embodiment. Specifically, in the first embodiment, when a read request for track No. 2 is issued from the channel 203 at the time between time 802 and time t2 shown in FIG. 8, the response to the channel 203 is after time t2 which delays one track. This delay becomes greater as the number of pre-load tracks increases. In the fourth embodiment, even if a read request for track No. 2 is issued at the time between time 2502 and time 2501 shown in FIG. 21, the response to the channel 203 is delayed only by 0.5 track. This delay is always 0.5 track even if the number of pre-load tracks increases.

As described above, under the condition that the overhead of connecting the transfer path 107a is small, the delay to the channel 203 can be made short by transferring data to the controller 210 separately for each track.

What is claimed is:

1. A data transfer system for buffered storage devices in which information recorded in a recording medium is read via a buffer memory and a cache in response to a request from a processor, comprising:

a controller including said cache and a transfer information judging unit, said cache being connected to said processor for storing information, and said transfer information judging unit being responsive to a read instruction issued by said processor for reading information in said recording medium, and determining a first transfer enabled time for storing the information of a first track of said recording medium in said cache and a second transfer enabled time for storing the information of a second track of said recording medium in said cache; and a storage device connected to said controller, said storage device including at least said recording medium having said first and second tracks corresponding to a request track for recording information requested from said processor and a pre-load track close to said request track, respectively, a buffer memory for temporarily storing the information read from said request track and pre-load track of said recording medium at every track, and a buffer controller receiving at least the information of said request track and said first and second transfer enabled times from said controller, for outputting an instruction to transfer at least the information of said request track and said pre-load track from said buffer memory to said cache at said first and second transfer enabled times, wherein between said recording medium and said buffer memory and between said buffer memory and said cache a ratio of a speed for transferring the information from said recording medium to said buffer memory and a speed for transferring the information from said buffer memory to said cache is 1:n (1≦n), and said buffer controller provides instructions such that the information of said request track is transferred from said buffer memory to said cache at said first transfer enabled time which occurs when at least (1−1/n) of all of the information of said request track in said buffer memory has been transferred from said recording medium to said buffer memory and provides instructions such that the information of said pre-load track is transferred from said buffer memory to said cache at said second transfer enabled time which occurs when at least (1−1/n) of all of the information of said pre-load track has been transferred from said recording medium to said buffer memory and, wherein the read instruction which causes information of the request track and the pre-load track to be stored by the buffer memory, is a single read instruction.

2. A data transfer system for buffered storage devices according to claim 1, wherein said storage device includes a load amount monitoring unit responsive to an instruction from said buffer controller for monitoring the amount of information transferred from said recording medium to said buffer memory.

3. A data transfer system for buffered storage devices according to claim 2, wherein said storage device includes an interrupting unit responsive to an instruction from said buffer controller for generating an interrupt signal at said first and second transfer enabled times and send said interrupt signal to said controller to transfer information from said buffer memory to said cache.

4. A data transfer system according to claim 1 wherein the information from the requested track and information from the pre-load track are transferred to the controller by the single read instruction such that information from a second requested track can be transferred to the controller prior to the information from the pre-load track.

5. A data transfer system for buffered storage devices in which information recorded in a recording medium is read via a buffer memory and a cache in response to a request from a processor, comprising:

a controller including said cache and a transfer information judging unit, said cache being connected to said processor for storing information, and said transfer information judging unit being responsive to a read instruction issued by said processor for reading information in said recording medium, and determining a transfer enabled time for storing the information of a track of said recording medium in said cache; and a storage device connected to said controller, said storage device including at least said recording medium having said track corresponding to a request track for recording information requested from said processor and a pre-load track close to said request track, respectively, a buffer memory for temporarily storing the information read from said request track and pre-load track of said recording medium at every track, and a buffer controller receiving at least the information of said request track and said transfer enabled time from said controller, for outputting an instruction to transfer at least the information of said request track and said pre-load track from said buffer memory to said cache at said transfer enabled time, wherein between said recording medium and said buffer memory and between said buffer memory and said cache a ratio of a speed for transferring the information from said recording medium to said buffer memory and a speed for transferring the information from said buffer memory to said cache is 1:n (1≦n), and said buffer controller provides instructions such that the information of said requested track is transferred from said buffer memory to said cache at said transfer enabled time which occurs when at least (1−1/n) of all of the information of said request track in said buffer memory has been transferred from said recording medium to said buffer memory and, wherein the read instruction which causes information of the request track and the pre-load track to be stored by the buffer memory, is a single read instruction.

6. A data transfer system for buffered storage devices in which information recorded in a recording medium is read via a buffer memory and a cache in response to a request from a processor, comprising:

a controller including said cache and a transfer information judging unit, said cache being connected to said processor for storing information, and said transfer information judging unit being responsive to a read instruction issued by said processor for reading information in said recording medium, and determining a transfer enabled time for storing the information of a track of said recording medium in said cache; and a storage device connected to said controller, said storage device including at least said recording medium having said track corresponding to a request track for recording information requested from said processor and a pre-load track close to said request track, respectively, a buffer memory for temporarily storing the information read from said request track and pre-load track of said recording medium at every track, and a buffer controller receiving at least the information of said request track and said transfer enabled time from said controller, for outputting an instruction to transfer at least the information of said request track and said pre-load track from said buffer memory to said cache at said transfer enabled time, wherein between said recording medium and said buffer memory and between said buffer memory and said cache a ratio of a speed for transferring the information from said recording medium to said buffer memory and a speed for transferring the information from said buffer memory to said cache is 1:n (1≦n), and said buffer controller provides instructions such that the information of said request track is transferred from said buffer memory to said cache at said transfer enabled time which occurs when at least (1−1/n) of all of the information of said request track in said buffer memory has been transferred from said recording medium to said buffer memory and instructs such that new information of a new requested track requested by said processor be transferred from said recording medium to said buffer memory, after said information of said requested track is transferred from said recording medium to said buffer memory, and to transfer said new information of said new requested track from said buffer memory to said cache and thereafter transfer said information of the previous pre-load track from said buffer memory to said cache.

7. A data transfer system according to claim 6 wherein the information from the requested track and information from the pre-load track are transferred to the controller by the single read instruction such that information from a second requested track can be transferred to the controller prior to the information from the pre-load track.

8. A data transfer system for buffered storage devices in which information recorded in a recording medium is read via a buffer memory and a cache in response to a request from a processor, comprising:

a controller including said cache and a transfer information judging unit, said cache being connected to said processor for storing information, and said transfer information judging unit being responsive to a read instruction issued by said processor for reading information in said recording medium, and determining a transfer enabled time for storing the information of a track of said recording medium in said cache; and a storage device connected to said controller, said storage device including at least said recording medium having said track corresponding to a request track for recording information requested from said processor and a pre-load track close to said request track, respectively, a buffer memory for temporarily storing the information read from said request track and pre-load track of said recording medium at every track, and a buffer controller receiving at least the information of said request track and said transfer enabled time from said controller, for outputting an instruction to transfer at least the information of said request track and said pre-load track from said buffer memory to said cache at said transfer enabled time, wherein between said recording medium and said buffer memory and between said buffer memory and said cache a ratio of a speed for transferring the information from said recording medium to said buffer memory and a speed for transferring the information from said buffer memory to said cache is 1:n (1≦n), and said buffer controller provides instructions such that the information of each of said request track and said pre-load track is transferred from said buffer memory to said cache at said transfer enabled time which occurs when at least (1−1/n) of all of the information of each of said request track and said pre-load track in said buffer memory has been transferred from said recording medium to said buffer memory and, wherein the read instruction is issued only once, when reading out data of the requested track, and thereafter, the storage device loads both data of the requested track and pre-load tracks to the buffer memory.

9. A data transfer method for buffered storage devices in which information recorded in a recording medium is read via a buffer memory and a cache in response to a request from a processor, comprising the steps of:

(a) in response to an information read instruction issued by said processor, obtaining tracks including a requested track on said recording medium recording said requested information and a pre-load track, and first and second transfer enabled times when said information is transferred to said cache;

(b) storing the information of said requested track from said recording medium in said buffer memory, in accordance with said obtained tracks;

(c) with a setting that the relation of between said recording medium and said buffer memory to between said buffer memory and said cache is defined by a ratio 1:n (1≦n) of an information transfer speed from said recording medium to said buffer memory to an information transfer speed from said buffer memory to said cache, transferring the information of said requested track from said buffer memory to said cache at said transfer enabled time when the information of said requested track from said recording medium to said buffer memory has reached at least (1−1/n) times all said information of said requested track; and (d) transferring the information of said pre-load track from said buffer memory to said cache at said second transfer enabled time when the information of said pre-load track loaded from said recording medium to said buffer memory has reached at least (1−1/n) times all said information of said information of said pre-load track, wherein the information read instruction issued by said processor which results in both the requested information and the pre-load information being stored to the buffer memory, is a single read instruction.

10. A data transfer method according to claim 9 wherein the information from the requested track and information from the pre-load track are transferred to the controller by the single read instruction such that information from a second requested track can be transferred to the controller prior to the information from the pre-load track.

11. A data transfer method for buffered storage devices in which information recorded in a recording medium is read via a buffer memory and a cache in response to a request from a processor, comprising the steps of:

(a) in response to a single information read instruction issued by said processor, obtaining tracks including a requested track on said recording medium recording said requested information and a pre-load track, and a transfer enabled time when said information is transferred to said cache;

(b) storing the information of said requested track and said pre-load track from said recording medium in said buffer memory, in accordance with said obtained tracks and said single information read instruction; and (c) with a setting that the relation of between said recording medium and said buffer memory to between said buffer memory and said cache is defined by a ratio 1:n ($1 \leq n$) of an information transfer speed from said recording medium to said buffer memory to an information transfer speed from said buffer memory to said cache, transferring the information of said requested track from said buffer memory to said cache at said transfer enabled time when the information of said requested track transferred from said recording medium to said buffer memory has reached at least $(1-1/n)$ times all said information of said requested track.

12. A data transfer method for buffered storage devices in which information recorded in a recording medium is read via a buffer memory and a cache in response to a request from a processor, comprising the steps of:

(a) in response to an information read instruction issued by said processor, obtaining tracks including a requested track on said recording medium recording said requested information and a pre-load track, and a transfer enabled time when said information is transferred to said cache;

(b) storing the information of said requested track from said recording medium in said buffer memory, in accordance with said obtained tracks;

(c) with a setting that the relation of between said recording medium and said buffer memory to between said buffer memory and said cache is defined by a ratio 1:n ($1 \leq n$) of an information transfer speed from said recording medium to said buffer memory to an information transfer speed from said buffer memory to said cache, transferring the information of said requested track from said buffer memory to said cache at said transfer enabled time when the information of said requested track from said recording medium to said buffer memory has reached at least $(1-1/n)$ times all said information of said requested track;

(d) transferring the information of a new requested track requested by said processor from said recording medium to said buffer memory after transferring the information of said requested track from said recording medium to said buffer memory;

(e) transferring the information of said new requested track from said buffer memory to said cache; and (f) transferring the information of the previous pre-load track from said buffer memory to said cache.

13. A data transfer method according to claim 12 wherein the information from the requested track and information from the pre-load track are transferred to the controller by the single read instruction such that information from a second requested track can be transferred to the controller prior to the information from the pre-load track.

14. A data transfer method for buffered storage devices in which information recorded in a recording medium is read via a buffer memory and a cache in response to a request from a processor, comprising the steps of:

(a) in response to a single read instruction issued by said processor, obtaining tracks including a requested track on said recording medium recording said requested information and a pre-load track, and a transfer enabled time when said information is transferred to said cache;

(b) storing the information of said requested track and said pre-load track from said recording medium in said buffer memory, in accordance with said obtained tracks and said single read instruction; and (c) with a setting that the relation of between said recording medium and said buffer memory to between said buffer memory and said cache is defined by a ratio 1:n ($1 \leq n$) of an information transfer speed from said recording medium to said buffer memory to said cache, transferring the information of each of said requested track and said pre-load track from said buffer memory to said cache at said transfer enabled time when the information of each of said requested track and said pre-load track transferred from said recording medium to said buffer memory has reached at least $(1-1/n)$ times all said information of each of said requested track and said pre-load track.

* * * * *